United States Patent
Petrangeli et al.

(10) Patent No.: US 11,217,208 B2
(45) Date of Patent: Jan. 4, 2022

(54) LOW-LATENCY ADAPTIVE STREAMING FOR AUGMENTED REALITY SCENES

(71) Applicant: Adobe Inc., San Jose, CA (US)

(72) Inventors: Stefano Petrangeli, Mountain View, CA (US); Viswanathan Swaminathan, Saratoga, CA (US); Na Wang, Fairfax, VA (US); Haoliang Wang, San Jose, CA (US); Gwendal Simon, Rennes (FR)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/834,776

(22) Filed: Mar. 30, 2020

(65) Prior Publication Data

US 2021/0304706 A1    Sep. 30, 2021

(51) Int. Cl.
*G09G 5/36* (2006.01)
*G06F 16/487* (2019.01)
*G06F 16/44* (2019.01)

(52) U.S. Cl.
CPC ............. *G09G 5/36* (2013.01); *G06F 16/444* (2019.01); *G06F 16/487* (2019.01); *G09G 2340/0407* (2013.01); *G09G 2354/00* (2013.01); *G09G 2370/022* (2013.01)

(58) Field of Classification Search
None
See application file for complete search history.

(56) References Cited

U.S. PATENT DOCUMENTS

2017/0060901 A1 *   3/2017   Kristiansen   ........... G06F 16/182

FOREIGN PATENT DOCUMENTS

WO    WO-2020154206 A1 *   7/2020   ....... H04N 21/85406

OTHER PUBLICATIONS

Park et al. "Volumetric Media Streaming for Augmented Reality" (Year: 2018).*
S. Rusinkiewicz and M. Levoy, "Streaming qsplat: A viewer for networked visualization of large, dense models," in Proceedings of the 2001 Symposium on Interactive 3D Graphics, ser. I3D '01. New York, NY, USA: ACM, 2001, pp. 6368. [Online]. Available: http://doi.acm.org/10.1145/364338.364350.

(Continued)

*Primary Examiner* — Yi Wang
(74) *Attorney, Agent, or Firm* — Keller Jolley Preece

(57) ABSTRACT

The present disclosure relates to systems, non-transitory computer-readable media, and methods that iteratively select versions of augmented reality objects at augmented reality levels of detail to provide for download to a client device to reduce start-up latency associated with providing a requested augmented reality scene. In particular, in one or more embodiments, the disclosed systems determine utility and priority metrics associated with versions of augmented reality objects associated with a requested augmented reality scene. The disclosed systems utilize the determined metrics to select versions of augmented reality objects that are likely to be viewed by the client device and improve the quality of the augmented reality scene as the client device moves through the augmented reality scene. In at least one embodiment, the disclosed systems iteratively select versions of augmented reality objects at various levels of detail until the augmented reality scene is fully downloaded.

20 Claims, 12 Drawing Sheets

(56) References Cited

OTHER PUBLICATIONS

H. Hoppe, "Smooth view-dependent level-of-detail control and its application to terrain rendering," in Proceedings Visualization '98 (Cat. No. 98CB36276), Oct. 1998, pp. 3542.

Chim, R. W.H. Lau, H. V. Leong, and A. Si. 2003. CyberWalk: a web-based distributed virtual walkthrough environment. Trans. Multi. 5, 4 (Dec. 2003), 503-515. DOI: https://doi.org/10.1109/TMM.2003. 819094.

K. Lee, D. Chu, E. Cuervo, J. Kopf, Y. Degtyarev, S. Grizan, A. Wolman, and J. Flinn, "Outatime: Using speculation to enable low-latency continuous interaction for mobile cloud gaming," in Proceedings of the 13th Annual International Conference on Mobile Systems, Applications, and Services, ser. MobiSys '15. New York, NY, USA: ACM, 2015, pp. 151165. [Online]. Available: http://doi.acm.org/10.1145/2742647.2742656.

V. Swaminathan and S.Wei. "Low latency live video streaming using HTTP chunked encoding". In Proceedings of 2011 IEEE 13th International Workshop on Multimedia Signal Processing.

S. Wei and V. Swaminathan. V. Swaminathan and S.Wei. "Low Latency Live Video Streaming over HTTP 2.0". In Proceedings of Network and Operating System Support on Digital Audio and Video Workshop (NOSSDAV 14).

S. Petrangeli, V. Swaminathan, M. Hosseini, F. De Turek. "An HTTP/2-Based Adaptive Streaming Framework for 360° Virtual Reality Videos". In Proceedings of the 25th ACM international conference on Multimedia (ACM MM 15). pp. 306-314.

S. Petrangeli, G. Simon and V. Swaminathan, "Trajectory-Based Viewport Prediction for 360-Degree Virtual Reality Videos," 2018 IEEE International Conference on Artificial Intelligence and Virtual Reality (AIVR), Taichung, Taiwan, 2018, pp. 157-160.

Fang Meng and Hongbin Zha,"Streaming transmission of point-sampled geometry based on view-dependent level-of-detail," in Fourth Interna-tional Conference on 3-D Digital Imaging and Modeling, 2003. 3DIM 2003. Proceedings., Oct. 2003, pp. 466-473.

J. Pouderoux and J.-E. Marvie, "Adaptive streaming and rendering of large terrains using strip masks," in Proceedings of the 3rd International Conference on Computer Graphics and Interactive Techniques in Australasia and South East Asia, ser. GRAPHITE '05. New York, NY, USA ACM, 2005, pp. 299-306. [Online]. Available: http://doi.acm.org/10.1145/1101389.1101452.

C. Zach, "Prefetching policies for remote walkthroughs," in 10th International Conference in Central Europe on Computer Graphics, Visualization and Computer Vision 2002. ., 2002, pp. 153-159.

Z. Zhou, K. Chen, and J. Zhang, "Efficient 3-d scene prefetching from learning user access patterns," IEEE Transactions on Multimedia, vol. 17, No. 7, pp. 1081-1095, Jul. 2015.

F. W. B. Li, R. W. H. Lau, D. Kilis, and L. W. F. Li, "Game-on-demand: : An online game engine based on geometry streaming," TOMCCAP, vol. 7, No. 3, pp. 19:1-19:22, 2011. [Online]. Available: https://doi.org/10.1145/2000486.2000493.

J. Park, P. A. Chou, and J. Hwang, "Volumetric media streaming for augmented reality," in 2018 IEEE Global Communications Conference (GLOBECOM), Dec. 2018, pp. 1-6.

J. van der Hooft, T. Wauters, F. De Turek, C. Timmerer, and H. Hell-wagner, "Towards 6dof http adaptive streaming through point cloud compression," in Accepted for publication at the 2019 ACM Multimedia Conference, Oct. 2019.

P. Cozzi and K. Ring, 3D Engine Design for Virtual Globes, 1st ed. Natick, MA, USA: A. K. Peters, Ltd., 2011.

A. Bentaleb, B. Taani, A. C. Begen, C. Timmerer, and R. Zimmermann, "A survey on bitrate adaptation schemes for streaming media over http," IEEE Communications Surveys Tutorials, vol. 21, No. 1, pp. 562-585, Firstquarter 2019.

C. Li, W. Zhang, Y. Liu, and Y. Wang, "Very long term field of view prediction for 360-degree video streaming," in 2019 IEEE Conference on Multimedia Information Processing and Retrieval (MIPR), Mar. 2019, pp. 297-302.

G. Simon, S. Petrangeli, N. Carr, and V. Swaminathan, "Streaming a sequence of textures for adaptive 3d scene delivery," in 2019 IEEE Conference on Virtual Reality and 3D User Interfaces (VR), Mar. 2019, pp. 1159-1160.

P. Krajcevski, S. Pratapa, and D. Manocha, "Gst: Gpu-decodable supercompressed textures," ACM Trans. Graph., vol. 35, No. 6, pp. 230:1-230:10, Nov. 2016. [Online]. Available: http://doi.acm.org/10. 1145/2980179.2982439.

\* cited by examiner

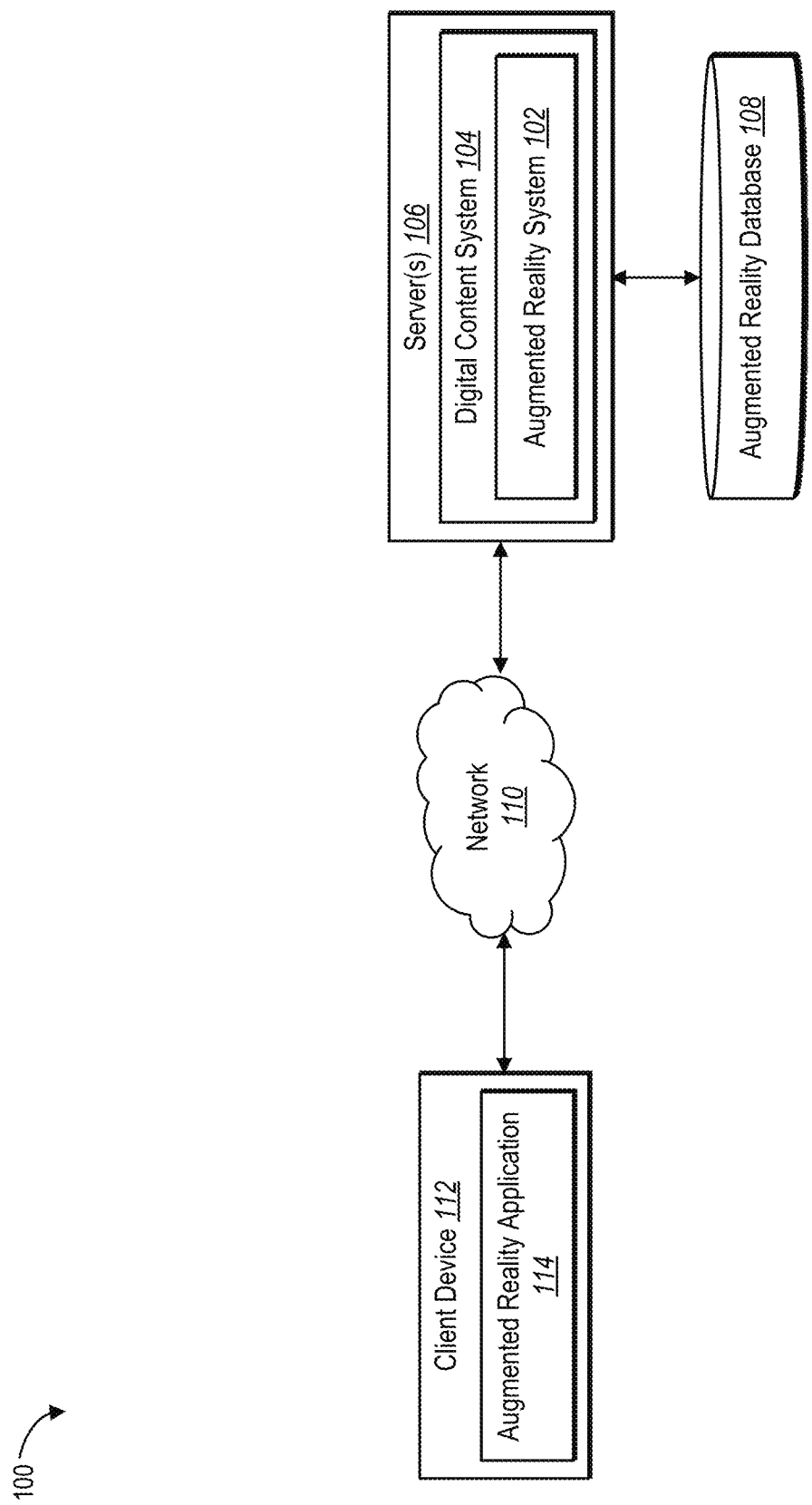

LOW-LATENCY ADAPTIVE STREAMING FOR AUGMENTED REALITY SCENES

BACKGROUND

Recent years have seen significant improvements in augmented reality systems. For example, conventional systems can provide augmented reality scenes for display on client devices such as mobile phones, tablets, and/or augmented reality glasses. To illustrate, conventional systems can provide augmented reality objects for display on a client device and positioned within an augmented reality scene such that as the client device moves through the scene, the user of the client device can view the augmented reality objects positioned within the scene via a display of the client device.

Although conventional systems can provide augmented reality objects as part of an augmented reality scene, such systems have a number of problems in relation to flexibility and efficiency, particularly with regard to loading and displaying an augmented reality scene. For instance, conventional systems inflexibly provide augmented reality objects for initial display to client devices as a monolithic entity. Specifically, in response to receiving a request for an augmented reality scene, conventional systems cause the client device to display the augmented reality objects associated with that scene once the objects are downloaded. Thus, conventional augmented reality scenes generally suffer from high latency because an initial view of the augmented reality scene takes a significant amount of time to download at the client device.

These along with additional problems and issues exist with regard to conventional augmented reality systems.

BRIEF SUMMARY

Embodiments of the present disclosure provide benefits and/or solve one or more of the foregoing or other problems in the art with systems, non-transitory computer-readable media, and methods for low-latency adaptive streaming of augmented reality scenes. In particular, the disclosed systems can improve start-up latency in augmented reality systems by dynamically identifying and downloading different augmented reality objects at different augmented reality levels of detail based on real-time features corresponding to the augmented reality scene. For instance, the disclosed systems can strategically sequence download requests associated with augmented reality objects at different levels of detail based on positions of augmented reality objects within current and predicted fields of view, movement of client devices within the augmented reality scenes, object complexity, and/or download capabilities. Thus, the disclosed systems sequence augmented reality object downloads such that objects are downloaded to a client device in an order and at a level of detail that reflects the significance of objects within any particular view, prioritizes objects that are most likely to be viewed, and anticipates future fields of view. In this manner, the disclosed systems reduce start-up latency or memory requirements in augmented reality systems by iteratively and flexibly providing augmented reality objects at appropriate levels of detail within an augmented reality scene.

BRIEF DESCRIPTION OF THE DRAWINGS

The detailed description is described with reference to the accompanying drawings in which:

FIG. 1 illustrates an example environment in which an augmented reality system operates in accordance with one or more embodiments;

DETAILED DESCRIPTION

Figure 2B:
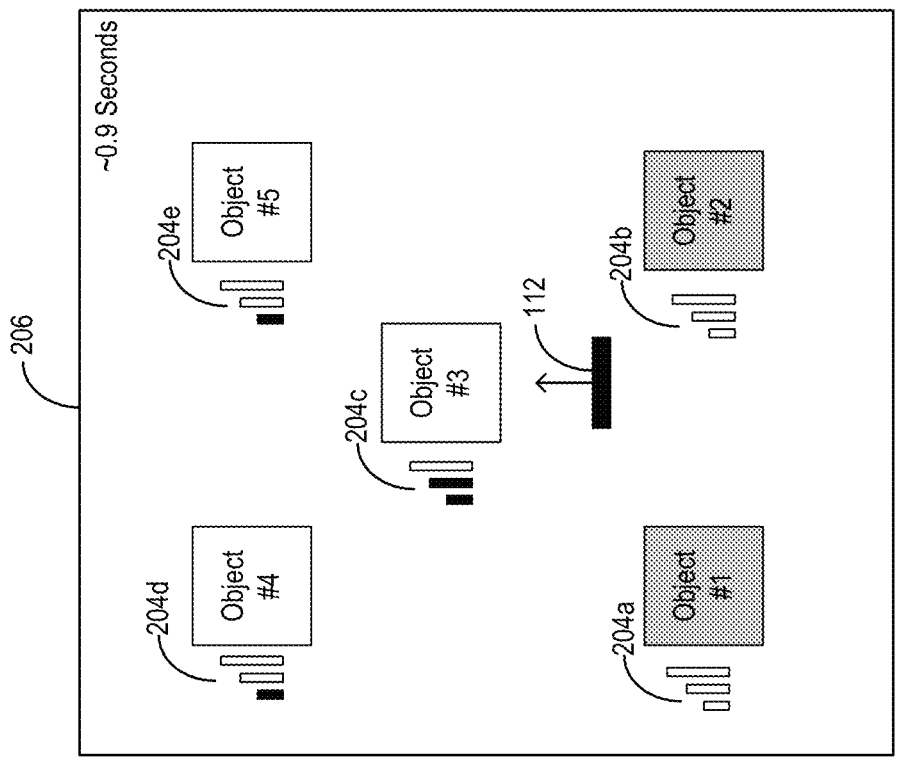
FIG. 2B illustrates an example of the augmented reality system iteratively providing versions of augmented reality objects in an augmented reality scene in accordance with one or more embodiments.

One or more embodiments of the present disclosure include an augmented reality system for low-latency adaptive streaming of augmented reality scenes. In particular, the augmented reality system can reduce start-up latency for displaying a requested augmented reality scene by iteratively downloading augmented reality objects at varying levels of detail for display on a client device. In one or more embodiments, the augmented reality system iteratively selects augmented reality objects at varying levels of detail over time based on utility and priority metrics associated with the objects in the corresponding augmented reality scene. Specifically, the augmented reality system can identify significant objects in a scene to prioritize in delivery, adapt the level of detail to emphasize objects that are most likely to be viewed (while considering available network resources), and predict the future field of view using data-driven approaches to anticipate movement within the augmented reality scene. In this way, the augmented reality system can efficiently and flexibly select and provide augmented reality objects at appropriate levels of detail that are most likely to be viewed at a client device.

To further illustrate, in response to receiving a request for an augmented reality scene from a client device, the augmented reality system can identify augmented reality objects associated with the requested augmented reality scene. Each identified augmented reality object can be associated with a plurality of versions, each version corresponding to a plurality of augmented reality levels of detail. For example, an augmented reality object may have three corresponding versions—one at a low level of detail, one at a medium level of detail, and one at a high level of detail. Each level of detail may be associated with different degrees of realism such that the version of the augmented reality element at the high level of detail is more photo-realistic than the version at the low level of detail.

After identifying the augmented reality objects, the augmented reality system can determine selection scores for the plurality of versions of the augmented reality objects corresponding to the plurality of augmented reality levels of detail. For example, the augmented reality system can determine selection scores based on positions within the augmented reality scene within the augmented reality scene relative to the client device (e.g., distance to the client device), probabilities that each augmented reality object will come within a field of view corresponding to the client device, error perception measures, and available augmented reality download resources. In at least one embodiment, the augmented reality system can utilize the selection scores to identify a versions of augmented reality objects at levels of detail to provide for display within the augmented reality scene via the client device. The augmented reality system can further download the versions for the plurality of augmented reality objects at the levels of detail for display on a client device.

In one or more embodiments, the augmented reality system can utilize various metrics in determining the selection score for a version of an augmented reality object. For example, the augmented reality system can generate a level-of-detail utility metric for the version of the augmented reality object. In one or more embodiments, the augmented reality system generates this utility metric based on an error perception measure and augmented reality download resources (e.g., bandwidth, processing resources, and/or an estimated download time). For example, the augmented reality system can determine the error perception measure for the version of the augmented reality object based on complexity of an augmented reality object and a distance between the position of the augmented reality object from the client device within the augmented reality scene. Additionally, the augmented reality download resources can include a download time for the version of the augmented reality object which can be based on current network resources in combination with computational speed of the client device in light of the complexity of the version of the augmented reality object. In at least one embodiment, the resulting level-of-detail utility metric represents a visual quality improvement that the user of the client device would gain by including the version of the augmented reality object in the augmented reality scene.

As mentioned above, the augmented reality system can also prioritize significant objects within a particular field of view in selecting augmented reality objects to download. For example, the augmented system can determine a selection score for the version of the augmented reality object based on an object priority metric. In one or more embodiments, the augmented reality system generates the object priority metric based on the current field of view of the client device, a predicted future field of view of the client device, and/or angular distance between the version of the augmented reality object and a direction of the current (or predicted) field of view of the client device. In at least one embodiment, the resulting priority metric reflects a measure of how important the augmented reality object is relative to the current position of the client device. The priority metric can also reflect significance of the augmented reality object relative to a predicted future position of the client device within a threshold amount of time (i.e., within a prediction horizon).

In at least one embodiment, the augmented reality system selects versions of augmented reality objects based on selection scores and a reaction time threshold. For example, the augmented reality system can operate under a heuristic that recognizes that the relevance of selections may only last for a limited amount of time (because the client device can move freely through the augmented reality scene). As such, the augmented reality system can select augmented reality objects and augmented reality levels of detail such that the selected objects can be downloaded within the reaction time threshold.

After identifying and downloading an initial set of versions of augmented reality objects, the augmented reality system can iteratively provide additional sets of versions of augmented reality objects at additional augmented reality levels of detail at additional time increments until the entire augmented reality scene is downloaded. For example, because the client device can move freely within the augmented reality scene, level-of-detail utility metrics and object priority metrics change over time. It follows, for instance, that a particular augmented reality object may gain prominence relative to the client device as the client device moves closer to that object. Accordingly, the augmented reality system may incrementally identify and download the augmented reality object at increasing levels of detail over time, depending on the movement of the client device.

The augmented reality system can provide a number of advantages and benefits relative to conventional augmented reality systems. For example, the augmented reality system can improve flexibility by iteratively downloading a subset of all the augmented reality objects associated with a scene at varying levels of detail. In contrast to conventional systems that provide an augmented reality scene for display once it is monolithically downloaded, the augmented reality system initially provides objects that are most likely to be viewed first by the client device at the highest levels of detail. Thus, the augmented reality system dramatically reduces the start-up latency associated with viewing the augmented reality scene because client devices are able to display augmented reality objects faster.

In addition to improving flexibility, the augmented reality system can also improve efficiency in utilizing computing resources relative to conventional systems. For example, rather than causing a client device to download all objects associated with an augmented reality scene, the augmented reality system customizes the requested level of detail based on priority and level-of-detail utility metrics. In this way, the augmented reality system can efficiently utilize computing and network resources by causing a client device to download an object at a level of detail that is tailored to the client device's position and movement through the corresponding augmented reality scene.

Furthermore, the augmented reality system efficiently utilizes memory resources associated with a client device. For example, in some embodiments, a client device may not be capable of fitting all of the highest quality versions of objects in memory of the client device. The augmented reality system can tailor the provision of the augmented reality scene in order to improve utilization of memory resources. For instance, the augmented reality system can retrieve/fetch only content that is likely to be viewed, and at appropriate levels-of-detail that provide the best viewing experience to the user. In this manner, the augmented reality system can tailor objects to be downloaded based on the memory capabilities of the client device.

In addition, in one or more embodiments, the augmented reality system may render an augmented reality scene at the server-level and then stream the rendered scene to the client device. In such embodiments, the augmented reality system can minimize the computing and memory resources spent in rendering the augmented reality scene at the server.

Moreover, the augmented reality system can improve flexibility and efficiency without sacrificing accuracy. Indeed, the augmented reality system can cause a client device to iteratively download an object at a level of detail that considers the client device's position relative to the object and the anticipated movement of the client device within the augmented reality space. For example, if the client device is positioned within the associated augmented reality scene at a distance far from the object (and the client device is not travelling toward the object), the augmented reality system can specifically download a lower level of detail for the object. Then as the client device moves closer to the object within the scene, the augmented reality system can iteratively cause the client device to download higher levels of detail for the object. Thus, the augmented reality system can provide accurate augmented reality representations while reducing latency and improving flexibility of implementing computing devices.

As illustrated by the foregoing discussion, the present disclosure utilizes a variety of terms to describe features and advantages of the augmented reality system. Additional detail is now provided regarding the meaning of such terms. For example, as used herein, the term "augmented reality" refers to a computer-based construct that superimposes computer-generated media (e.g., digital images, three-dimensional objects, or digital animations) onto a view of the real world. Similarly, as used herein, the term "augmented reality scene" refers to a collection of augmented reality objects that are positioned relative to each other in a space. In particular, an augmented reality scene can include a collection of augmented reality objects with relative positions within a virtual space, where the augmented reality objects can be projected onto (e.g., superimposed over) a real-world environment based on their relative positions. Thus, an augmented reality scene can include augmented reality objects projected into positions of a real-world environment within a field of view of a client device. Accordingly, a client device can travel through an augmented reality scene by modifying positions of the client device relative to positions of the augmented reality objects as projected into the real-world environment.

Additionally, the term "augmented reality object" refers to a two or three-dimension digital media item superimposed (or capable of being super-imposed) on a view of the real world. For example, an augmented reality object can include a digital model of a three-dimensional item within an augmented reality scene. To illustrate, a user can request, via a client device, an augmented reality scene including a plurality of augmented reality objects. The user can then view the augmented reality scene overlaid on a real-world view provided via a display of the client device. The user can move client device through a real-world space in order to interact with the augmented reality objects within the augmented reality scene. Although many of the embodiments herein are described in relation to augmented reality scenes, the disclosed approaches can also be implemented within virtual reality scenes and virtual reality objects.

In one or more embodiments, an augmented reality object is associated with multiple versions or levels of detail. As used herein, a "version" or "level of detail" refers to an amount, level, and/or resolution of visual data (e.g., an augmented reality object having a level of detail refers to a version of an augmented reality object that includes a corresponding level of visual data). For example, a version of an augmented reality object with a high level of detail includes a high level of visual data—leading to a higher resolution display of that version (e.g., a higher concentration of voxels/pixels, increased smoothness, additional surface definition, larger file size, etc.). Conversely, a version of an augmented reality object with a low level of detail includes a low level of visual data—leading to a lower resolution display of that version. It follows that a version of an augmented reality object with a high level of detail looks more realistic when viewed up-close via a display of a client device. Similarly, a version of an augmented reality object with a low level of detail looks less realistic when viewed up-close via a display of a client device. In at least one embodiment, the augmented reality system can store or access multiple versions of the same augmented reality object, each at different levels of detail. While examples discussed herein describe augmented reality objects having three versions or levels of detail, in other examples and embodiments, augmented reality objects may be associated with a different number of versions or levels of detail (e.g., 2 levels of detail, five levels of detail, or ten levels of detail). Moreover, in an additional or alternative embodiment, augmented reality objects may only be associated with a single version or level of detail.

As will be described in more detail below, in one or more embodiments, the augmented reality system provides augmented reality objects at levels of detail based on selection scores associated with the augmented reality objects at each of its levels of detail. As used herein, the "selection score" refers to a score utilized to select an augmented reality object and/or a level of detail. As discussed in greater detail below, a selection score can reflect both the utility and priority of a version of an augmented reality object within an augmented reality scene for a period of time. In one or more embodiments, the augmented reality system determines selection scores for versions of augmented reality objects at a timestamp. The augmented reality system can also utilize selections scores determined across multiple timestamps relative to a version of an augmented reality object to determine (e.g., by combining selection scores, by identifying a highest selection score) a cumulative or overall selection score for that version of the augmented reality object. For example, the augmented reality system can apply an object function (e.g., a knapsack approach) that selects versions of augmented reality objects based on improving cumulative selection scores for the versions of augmented reality objects.

As used herein, a "level-of-detail utility metric" refers to a measure of quality perception relative to download resources associated with a version of an augmented reality object. In particular, a level-of-detail utility metric can be based on a complexity of the version of the augmented reality object, a distance of the position of the augmented reality object from the client device within the augmented reality scene, and download time for the augmented reality object. In at least one embodiment, augmented reality system determines a level-of-detail utility metric based on an error perception measure (such as screen-space error or world-space error) relative to download time.

Additionally as used herein, an "object priority metric" refers to a measure of focus or priority of an object relative to a field of view (e.g., either inside or outside a current field of view). For instance, an object priority metric can indicate a measure field of view within an augmented reality scene corresponding to the augmented reality object and/or a proximity relative to a focus (e.g., center) of the field of view. In particular, an object priority metric can include a current measure of field of view (e.g., percent field of view occupied by an augmented reality object) and/or a predicted measure of field of view (e.g., a predicted percent field of view occupied by an augmented reality object) together with angular distance to the object within the field of view.

As used herein, a "field of view" refers to a viewable area seen through a client device. For example, a client device's field of view can include the viewable area seen through augmented reality glasses or a viewable area seen through a display screen of the client device. As used herein, a "direction" of a field of view (or "view direction") refers to an orientation or angle of a field of view. For example, a direction of a field of view can include a direction that an augmented reality device is facing (e.g., an angle between the augmented reality device and an object at the center of the field of view).

In one or more embodiments, the augmented reality system identifies and provides versions of an augmented reality objects within a reaction time threshold. As used herein, a "reaction time threshold" refers to a threshold amount of time for providing one or more augmented reality objects. The reaction time threshold may be based on a variety of factors, including augmented reality download resources and/or movement through an augmented reality scene.

As used herein, "augmented reality download resources" refers to a measure of computing resources (e.g., processing power, memory, storage, time, or bandwidth) needed or utilized by a client device to download an augmented reality object and/or augmented reality scene. For instance, an augmented reality download resources can include a download time for an augmented reality object. Augmented reality download resources can include a variety of measures, including network resources, processing speed of the client device, file size, etc.

As used herein, "movement signals" refer to data that indicates movement (e.g., velocity, acceleration, or rotation) of the client device. For example, movement signals include accelerometer data, gyroscopic data, GPS data, camera viewfinder data, and other data indicative of the movement of the client device. In one or more embodiments, the augmented reality system can utilize movement signals provided by the client device to determine speed and direction of movement associated with the client device (and a predicted field of view at a future time).

Additional detail regarding the augmented reality system will now be provided with reference to the figures. For example, FIG. 1 illustrates a schematic diagram of an example system environment 100 (e.g., the "environment" 100) for implementing an augmented reality system 102 in accordance with one or more embodiments. Thereafter, a more detailed description of the components and processes of the augmented reality system 102 is provided in relation to the subsequent figures.

As shown in FIG. 1, the environment 100 includes server(s) 106, a client device 112, and a network 110. Each of the components of the environment 100 can communicate via the network 110, and the network 110 may be any suitable network over which computing devices can communicate. Example networks are discussed in more detail below in relation to FIG. 11.

As mentioned, the environment 100 includes the client device 112. The client device 112 can be one of a variety of computing devices, including a smartphone, tablet, smart television, desktop computer, laptop computer, virtual reality device, augmented reality device, or other computing device as described in relation to FIG. 11. Although FIG. 1 illustrates a single client device 112, in some embodiments the environment 100 can include multiple different client computing devices, each associated with a different user. The client device 112 can further communicate with the server(s) 106 via the network 110. For example, the client device 112 can receive user input (e.g., a selection of augmented reality objects and/or an augmented reality scene to be viewed) and provide the information pertaining to user input to the server(s) 106.

In one or more embodiments, the client device 112 includes an augmented reality application 114. In particular, the augmented reality application 114 may be a web application, a native application installed on the client device 112 (e.g., a mobile application, a desktop application, etc.), or a cloud-based application where part of the functionality is performed by the server(s) 106. The augmented reality application 114 can request augmented reality scenes, and display corresponding versions of augmented reality objects at levels of detail overlaid on a real-world display presented via the client device 112. The augmented reality application 114 can also update the size, display, and clarity of augmented reality objects as the client device 112 moves through the augmented reality scene.

As illustrated in FIG. 1, the environment 100 includes the server(s) 106. The server(s) 106 may include one or more individual servers that may generate, store, receive, and transmit electronic data. For example, the server(s) 106 may receive data from the client device 112 in the form of a user input such as a selection of an augmented reality scene. In addition, the server(s) 106 can transmit data to the client device 112. Furthermore, the server(s) 106 can include one or more machine learning models. In some embodiments, the server(s) 106 comprises a content server. The server(s) 106 can also comprise an application server, a communication server, a web-hosting server, a social networking server, or a digital content analytics server.

As shown in FIG. 1, the server(s) 106 can also include the augmented reality system 102 as part of a digital content system 104. The digital content system 104 can communicate with the client device 112 to generate, modify, store, and transmit digital content. For example, the digital content system 104 can store and access versions of augmented reality objects at augmented reality levels of detail. Furthermore, in one or more embodiments, the client device 112 can download the augmented reality application 114 from the server(s) 106 or the augmented reality application 114 can be a web-based application hosted by the server(s) 106.

Although FIG. 1 depicts the augmented reality system 102 located on the server(s) 106, in some embodiments, the augmented reality system 102 may be implemented by (e.g., located entirely or in part) on one or more other components of the environment 100. For example, the augmented reality system 102 may be implemented in whole, or in part, by the client device 112. Thus, for example, the client device 112 can implement (in whole, or as part of a distributed computing system with the server(s) 106) one or more machine learning models or perform the acts and algorithms described herein for selectively downloading and/or rendering augmented reality objects within an augmented reality scene.

Moreover, the environment 100 also includes the augmented reality database 108. In one or more embodiments, the augmented reality database 108 stores versions of augmented reality objects at augmented reality levels of detail in correlation with augmented reality scenes. In at least one embodiment, the augmented reality system 102 can query the versions of augmented reality objects that correspond with a requested augmented reality scene, and then identify a set of versions of augmented reality objects to provide to the client device 112 based on determined selection scores, as will be described in greater detail below.

Figure 2A:
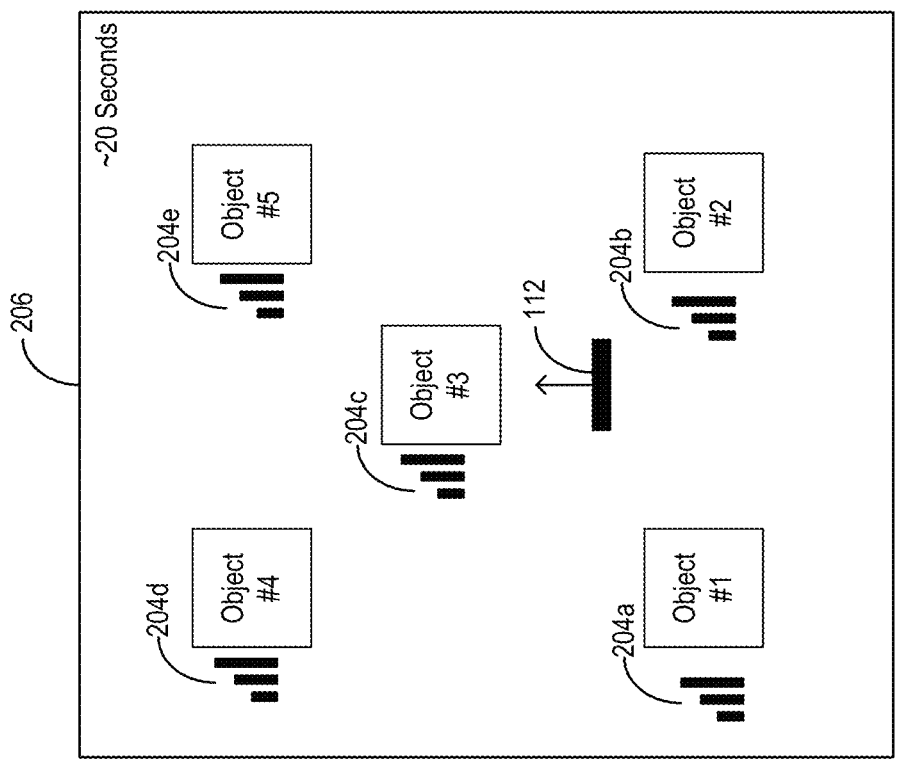
FIG. 2A illustrates a prior art example of a conventional augmented reality system providing an augmented reality scene.

To further illustrate the features and advantages of the present augmented reality system 102 over prior art systems, FIG. 2A presents a schematic diagram of the client device 112 operating in conjunction with a conventional system and FIG. 2B presents a schematic diagram of the client device 112 operating in conjunction with the augmented reality system 102. For example, as shown in FIG. 2A, in response to receiving a request for the augmented reality scene 206 including augmented reality objects #1-#5, the conventional system provides the augmented reality scene 206 to the client device 112 once all of the augmented reality objects #1-#5 are downloaded to the client device 112 at full levels of detail (e.g., indicated by the level of detail meters 204a, 204b, 204c, 204d, and 204e). Because the prior art augmented reality system only provides the augmented reality scene 206 once all the augmented reality objects #1-#5 are downloaded at full levels of detail, the client device 112 is left to wait a long period of time (e.g., ~20 seconds) before any augmented reality object is provided for display.

Contrastingly, as shown in FIG. 2B and in response to receiving a request for augmented reality, the augmented reality system 102 iteratively causes the client device 112 to selectively download the augmented reality objects #1-#5 at levels of detail depending on the position and movement of the client device 112 through the augmented reality scene 206. For example, as shown in FIG. 2B, in response to receiving a request for the augmented reality scene 206 from the client device 112 at a position in the middle of the augmented reality scene 206 and facing the augmented reality object #3, the augmented reality system 102 can select versions of the objects #3, #4, and #5 at medium to low levels of detail. The augmented reality system 102 can further cause the client device 112 to download those versions of the objects at the determined levels of detail.

In one or more embodiments, the augmented reality system 102 identifies the augmented reality objects and levels of detail based various metrics related to the client device 112, the objects #1-#5, and the augmented reality scene 206. Thus, as further shown in FIG. 2B, the augmented reality system 102 may not initially identify and download the augmented reality objects #1 and #2 (e.g., as indicated by being grayed out) because those objects are outside the current and predicted future fields of view associated with the client device 112. Similarly, the augmented reality system 102 may identify and download the augmented reality objects #4 and #5 at lower levels of detail than that of the augmented reality object #3 (e.g., illustrated by the level of detail indicators 204a-204e) because objects #4 and #5 are at a greater distance from the client device 112. Additionally, because the augmented reality system 102 selectively identifies and downloads a subset of the augmented reality objects #1-#5 at appropriate levels of detail, the augmented reality system 102 presents a display of the augmented reality scene 206 in a fraction of the time (e.g., ~0.9 seconds) required by the prior art augmented reality system (e.g., ~20 seconds), shown in FIG. 2A. The result to the user of the client device 112 is dramatically reduced start-up latency with regard to viewing the augmented reality scene 206.

Figure 3:
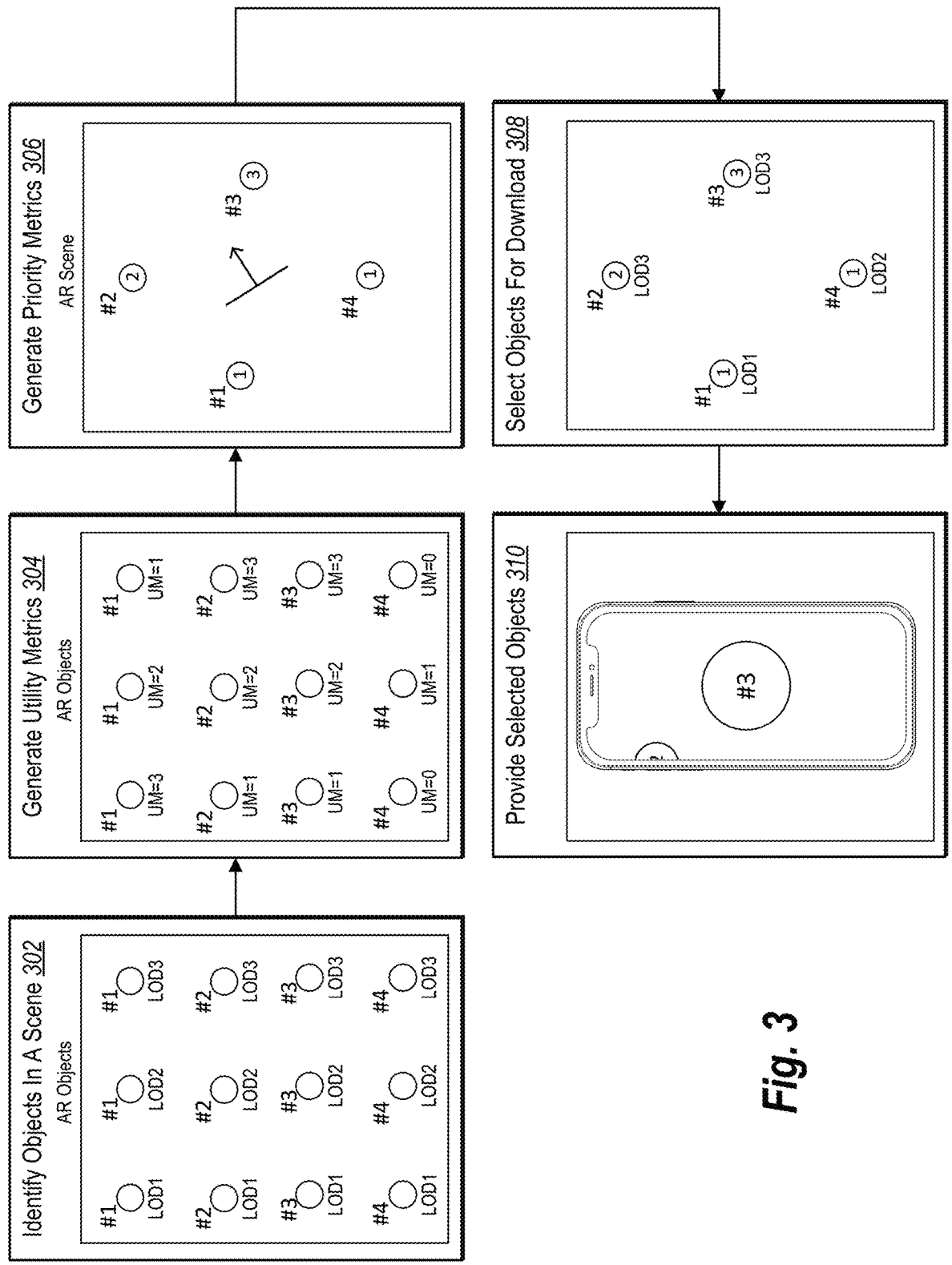
FIG. 3 illustrates an overview sequence diagram of selecting versions of augmented reality objects in accordance with one or more embodiments.

FIG. 3 illustrates an overview of identifying and providing augmented reality objects at augmented reality levels of detail in accordance with one or more embodiments. For example, in one or more embodiments and in response to receiving a request for an augmented reality scene from a client device, the augmented reality system 102 selects versions of the augmented reality objects to download from the requested scene based on a selection score. In at least one embodiment, the augmented reality system 102 determines the selection score for a particular version of an augmented reality object based on the object's utility and priority within the corresponding augmented reality scene for a threshold amount of time.

For example, as shown in FIG. 3, in selecting versions of augmented reality objects at levels of detail to provide for download to a client device, the augmented reality system 102 can identify the versions of the augmented reality objects associated with a requested augmented reality scene in an act 302. More specifically, as mentioned above, the augmented reality system 102 can store multiple versions of the same augmented reality object, each at different levels of detail (e.g., resolution levels), or "LODs". Thus, versions of an augmented reality object at low levels of detail may appear grainy and pixelated. Conversely, versions of the same augmented reality object at high levels of detail may appear sharp and photorealistic. As such, in response to receiving a request for an augmented reality scene, the augmented reality system 102 can identify versions of the augmented reality objects associated with the requested scene. For instance, the augmented reality system 102 can identify the versions of the objects utilizing a lookup table in connection with the augmented reality scene, by querying the augmented reality database 108 (e.g., as shown in FIG. 1) based on the augmented reality scene, or by another lookup method.

Additionally, the augmented reality system 102 can also generate level-of-detail utility metrics for the identified versions of the augmented reality objects as part of an act 304. In one or more embodiments, the level-of-detail utility metric for a particular version of an augmented reality object at a specific level of detail ("LOD") represents how that particular version contributes to the perceived quality of the augmented reality scene from the standpoint of the client device relative to the available augmented reality download resources needed to download the particular version to the client device (e.g., download time or some other resource metric). As mentioned above with regard to FIG. 1, the augmented reality system 102 can generate level-of-detail utility metrics at either the server(s) 106 or the client device 112.

In at least one embodiment, the augmented reality system 102 can determine the level-of-detail utility metric for a particular version of an augmented reality element based on an error perception measure. For example, an error perception measure can include a measure of perceived differences between rendering the level of detail of the particular version versus rendering a version of the augmented reality object at a different level of detail. The error perception measure can be further based on the distance between the position of the augmented reality object and the client device within the augmented reality scene. For example, and as will be discussed in greater detail below with regard to FIG. 5, the augmented reality system 102 can determine the error perception measure for a version of an augmented reality object based on one or more of a screen space error associated with the version of the augmented reality object, the visual complexity of the version of the augmented reality object, and a distance between the position of the version of the augmented reality object within the augmented reality scene and the position of the client device within the augmented reality scene.

In at least one embodiment, the augmented reality system 102 further determines the level-of-detail utility metric for the particular version of the augmented reality object based on augmented reality download resources. As mentioned above, the augmented reality system 102 can utilize a variety of metrics to quantify augmented reality download resources, such as download time corresponding to the particular version and the client device. The download time can be affected by currently available network resources, processing speed of the client device, and complexities of the particular version of the augmented reality object. In some embodiments, the augmented reality system 102 can utilize alternative measures for augmented reality download resources utilized to download an augmented reality object, such as file size, bandwidth needed, processing power utilized, etc.

As mentioned, the augmented reality system 102 can determine a level-of-detail utility metric by comparing an error perception measure for an object and augmented reality download resources. For example, in some embodiments, the augmented reality system 202 can determine a level-of-detail utility metric that reflects a ratio of an error perception measure and augmented reality resources. In some embodiments, the augmented reality system 202 can utilize a different comparison (e.g., a difference or product). In one or more embodiments, the augmented reality system 102 can repeat the level-of-detail utility metric calculation for each version of each augmented reality object associated with the requested augmented reality scene. In at least one embodiment, the augmented reality system 102 may determine that augmented reality objects in an augmented reality scene are only associated with a single level of detail (e.g., each object only has one version). In such an embodiment, the augmented reality system 102 does not perform the act 306 of determining utility metric, but rather skips to the act 306 of generating object priority metrics for the identified augmented reality object, as discussed below.

Furthermore, as shown in FIG. 3, the augmented reality system 102 can generate object priority metrics for the identified augmented reality objects as part of an act 306. In one or more embodiments, the object priority metric for a particular augmented reality object represents the significance of augmented reality object within a current and/or projected field of view relative to the client device. For example, an augmented reality scene may include multiple objects at different positions with different sizes and appearances. Given the augmented reality scene structure and the position and field of view of the client device, the augmented reality system 102 can determine the significance/priority of each object within the augmented reality scene. The augmented reality system 102 can determine the object priority metric for an augmented reality object based on a current field of view of the client device, a predicted future field of view of the client device, and an angular distance between a view direction of the client device and the object. The augmented reality system 102 can repeat the object priority metric determination for all the objects associated with the requested augmented reality scene.

Based on level-of-detail utility metrics and object priority metrics for the versions of the augmented reality objects associated with the requested augmented reality scene, the augmented reality system 102 can select specific versions of augmented reality objects to provide for download to the client device as part of an act 308. In at least one embodiment, the augmented reality system 102 selects version of objects based on an adaptation heuristic that strives to maximize the cumulative value of the levels of detail of objects selected, based on the level-of-detail utility metrics and the object priority metrics. Additionally, in at least one embodiment, the augmented reality system 102 utilizes the adaptation heuristic within a reaction time threshold, which ensures that the augmented reality system 102 selects a version of an object within an amount of time during which the selection is relevant based on the movement of the client device within the augmented reality scene. Any object version selected after the reaction time threshold is likely to no longer optimal because the position and field of view of the client device will have likely changed within the augmented reality scene.

More specifically, as mentioned above, the augmented reality system 102 can utilize the level-of-detail utility metrics and object priority metrics to determine selection scores for the versions of the augmented reality objects. To illustrate, in some embodiments, the augmented reality system 102 can combine the level-of-detail utility metrics and the object priority metrics (e.g., as part of a product, sum, ratio or other operation) to determine selection scores. The augmented reality system 102 can utilize these selection scores to select particular versions to download to the client device.

For example, in some embodiments, the augmented reality system 102 selects versions of objects utilizing an objective function that seeks to improve (e.g., maximize) the cumulative selection score for selected versions. In particular, the augmented reality system 102 can select versions that maximize the cumulative selection score, subject to a constraint that the selected versions can be downloaded within the reaction time threshold. In some embodiments, the augmented reality system 102 utilizes a multi-choice knapsack approach to select versions that maximize the selection score for the augmented reality scene subject to downloading the selected versions within the reaction time threshold.

Moreover, as shown in FIG. 3, the augmented reality system 102 provides the selected versions of the augmented reality objects for download to the requesting client device as part of an act 310. For example, the augmented reality system 102 provides the selected versions to the client device so that the client device displays the object versions overlaid on a real-world display of the area around the client device. In response to movement of the client device, the augmented reality system 102 can modify the display at the client device so that the augmented reality objects appear to stay within specific locations within the real-world environment. Thus, the user of the client device can interact with the augmented reality object by viewing the object via a display of the client device, and moving toward and around the augmented reality object as it is displayed in a particular location within the real-world environment. In one or more embodiments, the augmented reality system 102 can repeat the acts 302-310 over time. For example, the augmented reality system 102 can repeat the acts 302-310 at regular time intervals (e.g., based on the reaction time threshold).

As discussed above, the augmented reality system 102 reduces start-up latency associated with displaying an augmented reality scene by leveraging the notion that, at start-up, a viewer might not need all the content in the scene. Instead, the augmented reality system 102 dynamically decides which augmented reality objects and levels of detail should be downloaded to minimize start-up latency while still providing high visual quality. As such, the augmented reality system 102 iteratively selects objects and levels of detail over time based on a position of the client device 112, positions of the augmented reality objects within the augmented reality scene, and available network resources. In this way, the augmented reality system 102 can reduce both the amount of network bandwidth needed to download an augmented reality scene and the amount of computation power required to provide the augmented reality scene to the client device 112. For example, the augmented reality system 102 can increase the level of detail associated with a particular augmented reality object as the client device 112 moves toward that object, and avoid downloading augmented reality objects at levels of detail that are higher than necessary while still maintaining good visual quality within the augmented reality scene.

Figure 4:
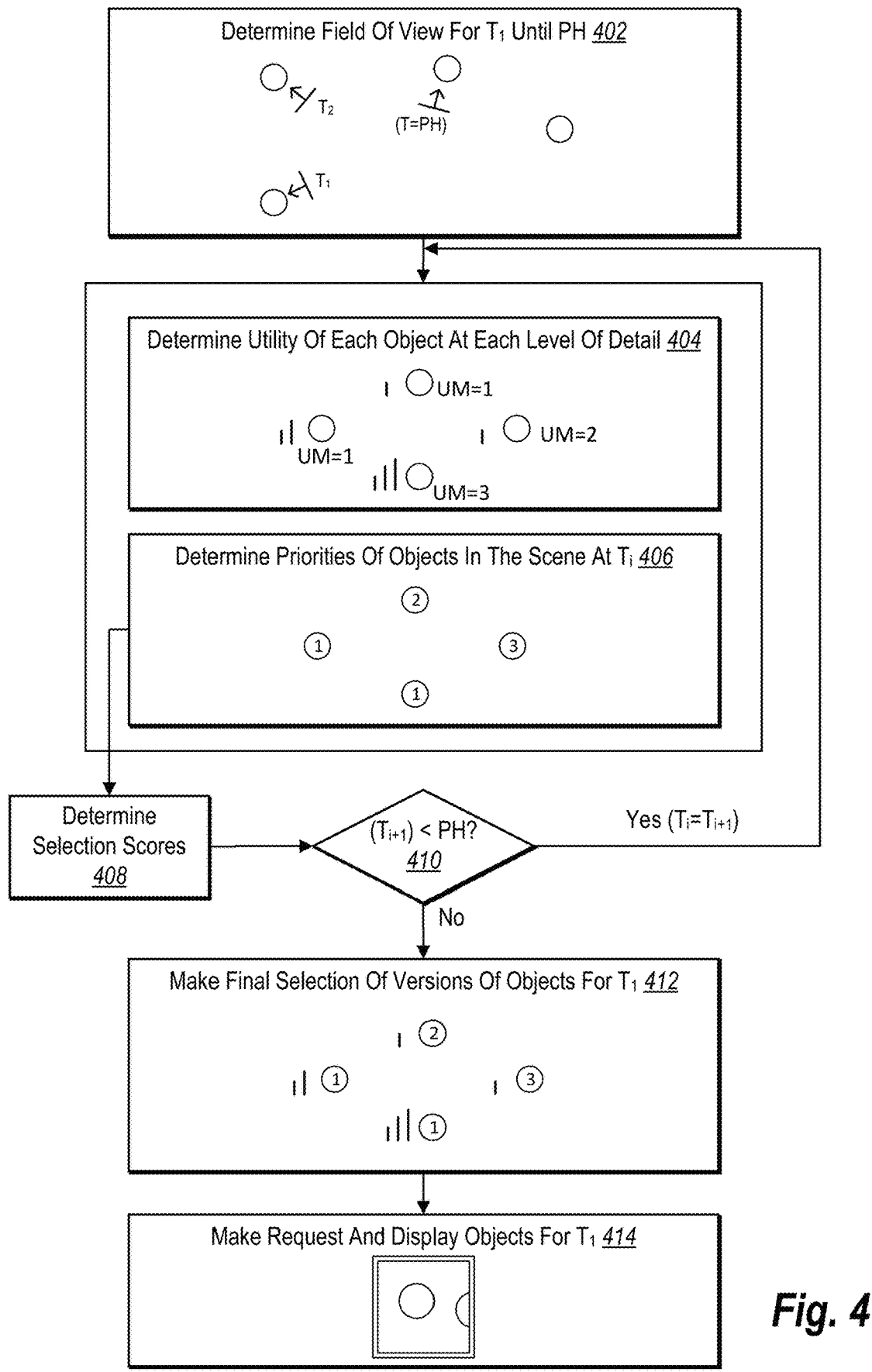
FIG. 4 illustrates a diagram of iteratively selecting versions of augmented reality objects over time in accordance with one or more embodiments.

FIG. 4 illustrates a sequence diagram of the augmented reality system 102 selecting versions of augmented reality objects based on the position and movement of a client device within an augmented reality scene. As will be discussed in greater detail below, the augmented reality system 102 can select versions of augmented reality objects by calculating metrics for the versions of augmented reality objects at timestamps between a current time and a prediction horizon. Moreover, the augmented reality system 102 can determine a total of the calculated metrics in order to identify select the versions for display.

As shown in FIG. 4, in an act 402, the augmented reality system 102 determines a field of view associated with the client device for every timestamp ("$T_i$") from the current time ($T_1$) until a future time (e.g., a prediction horizon, "PH"). In one or more embodiments, the augmented reality system 102 determines the variable prediction horizon based on a confidence of future predictions. For instance, the prediction horizon can include a time in which the augmented reality system 102 can predict future movement (or fields of view) within a threshold confidence level (e.g., 80%). To illustrate, the augmented reality system 102 can select a prediction horizon of two seconds based on a determination that it can predict a field of view two seconds into the future within an 80% confidence threshold. Accordingly, the prediction horizon can be based on the amount of historical behavioral data within the augmented reality scene, a number of objects in a scene, current movement signals, etc.

As mentioned above, the client device can move freely within the augmented reality scene, which means that the client device's field of view may change regularly. By predicting the client device's field of view in the future, the augmented reality system 102 reduces (i) missing augmented reality object download events, when an augmented reality object should be within the field of view of the client device but has yet to be streamed, and (ii) displaying a sub-optimal level of detail on the client device.

In the act 402, the augmented reality system 102 can predict the field of view for the client device utilizing one of several techniques. For example, the augmented reality system 102 can utilize dead-reckoning-based methods, 3D/Augmented Reality scene saliency estimation (based on content), and/or behavioral/analytics data-driven algorithms, where the goal is to learn similar exploration patterns for similar users exploring similar AR scenes.

To illustrate further, as just mentioned, the augmented reality system 102 can utilize a dead-reckoning-based method to determine a predicted field of view of the client device. For example, the augmented reality system 102 can determine the predicted field of view for the client device at a future time by determining the current position of the client device and advancing that position based on known or estimated speeds and movements of the client device. For instance, the augmented reality system 102 can estimate a speed, acceleration, rotation, or other movement of the client device by extrapolating movement signals from the client device. The augmented reality system 102 can then project the current speed, acceleration, or rotation to determine a future position/field of view at a future time. For example, if the augmented reality system 102 determines a rotational velocity of 2 angular units per second, the augmented reality system 102 can project that in one second, the field of view will have rotated 2 angular units.

Also as mentioned, in another embodiment, the augmented reality system 102 can utilize a 3D/Augmented Reality scene saliency estimation to determine a predicted field of view of the client device. For example, the augmented reality system 102 can determine the most attractive regions in the augmented reality scene based on the size and complexity of augmented reality objects positioned in each region. In one or more embodiments, the augmented reality system 102 can then predict a future field of view of the client device based on the estimated salient regions of the augmented reality scene and current movement signals from the client device to determine where the client device will likely move. To illustrate, the augmented reality system 102 can weight movements toward salient regions of the virtual reality scene in predicting fields of view for future timestamps.

Additionally, as mentioned above, the augmented reality system 102 can utilize behavioral/analytics data-driven algorithms to determine a predicted field of view of the client device. For example, the augmented reality system 102 can analyze past data (e.g., movement signals) associated with the client device to determine common patterns of movement. For instance, the augmented reality system 102 can analyze the past movement signals to determine that the client device typically moves clockwise through an augmented reality scene, that the client device typically moves at a medium pace through an augmented reality scene, etc.

The augmented reality system 102 can utilize a variety of machine learning models to determine predicted fields of view. For example, the augmented reality system 102 can utilize deep learning models, such as convolutional neural networks or recurrent neural networks to predict future fields of view (and/or future positions of client devices within an augmented reality scene). Indeed, the augmented reality system 102 can provide a neural network with movement signals to generate predicted fields of view for future timestamps.

In some embodiments, the augmented reality system 102 can train a machine learning model, such as a neural network, utilizing historical movement signals. For example, the augmented reality system 102 can utilize a neural network to analyze historical movement signals and generate predicted fields of view/positions. The augmented reality system 102 can compare the predicted fields of view/positions to ground truth (e.g., historical, measured fields of view/positions) to learn parameters of the neural network.

In this manner, the augmented reality system 102 can identify and/or predict a field of view for a client device. In particular, the augmented reality system 102 can determine fields of view for timestamps between a current time and a prediction horizon. In addition, the augmented reality system 102 can identify positions of augmented reality objects relative to these fields of view. For example, the augmented reality system 102 can identify relative positions of objects within a first field of view at a first time and relative positions of augmented reality objects within a second field of view at a second time. Accordingly, the augmented reality system 102 can determine augmented reality objects and their positions in the field of view of the client device for each timestamp between the current time and the prediction horizon.

As mentioned above, the augmented reality system 102 can select versions of augmented reality objects to download at a current timestamp by calculating metrics for the versions of augmented reality objects at timestamps between the current time and a prediction horizon. To illustrate, after the determining fields of view for the timestamp "$T_1$" (e.g., the current time) until the prediction horizon ("PH"), the augmented reality system 102 can perform an act 404 of determining level-of-detail utility metrics for the versions of the augmented reality objects associated with the augmented reality scene, and an act 406 of determining object priority metrics for the versions of the augmented reality objects associated with the augmented reality scene, in association with the field of view for each timestamp $T_i$ from $T_1$ to PH. The augmented reality system 102 can then utilize the determined metrics across the timestamps $T_i$ from $T_1$ to PH to make a final download selection of versions of augmented reality objects.

In more detail, the augmented reality system 102 performs the act 404 of determining level-of-detail utility metrics for the augmented reality objects associated with the augmented reality scene by determining how each version of each object contributes to the quality of the augmented reality scene based on the field of view of the client device at the timestamp "$T_i$." As discussed above with reference to FIG. 3, the augmented reality system 102 can determine the level-of-detail utility metric for a particular version of an augmented reality object based on a determined error perception measure and a determined download time. For example, the augmented reality system 102 can determine the error perception measure to represent a quality improvement to the augmented reality scene that would be gained by including the particular version of the augmented reality object at the specific level of detail, weighted by the time necessary to download that particular version to the client device. In at least one embodiment, the augmented reality system 102 determines a level-of-detail utility metric for every version of every augmented reality object associated with the augmented reality scene in the act 404.

The augmented reality system 102 also performs the act 406 of determining object priority metrics for augmented reality objects in the augmented reality scene at the timestamp "$T_i$." As mentioned above with relation to FIG. 3, the augmented reality system 102 determines the object priority metric for a particular augmented reality object to represent how important that object is within the augmented reality scene relative to the client device at timestamp "$T_i$." For example, the augmented reality system 102 can determine an object priority metric for a particular object based on the area of the current field of view occupied by the particular object, a potential area of the current field of view that would result if the client device was turned and pointed directly at the particular object, and current angular distance between the center of the current field of view of the client device and a center of the object. The augmented reality system 102 determines an object priority metric for every augmented reality object associated with the augmented reality scene at timestamp "$T_i$" in the act 406.

Additionally, the augmented reality system 102 determines selection scores for the versions of augmented reality objects in the act 408. For instance, the augmented reality system 102 can combine the level-of-detail utility metric and the object priority metric for a particular version of an augmented reality object to determine the selection score for that particular version. The augmented reality system 102 can determine selection scores for each version of each augmented reality object associated with the augmented reality scene at the timestamp "$T_i$."

As mentioned, the augmented reality system 102 can determine selection scores for future timestamps (up to a prediction horizon). Accordingly, in addition to determining selection scores for the versions of the augmented reality objects associated with the augmented reality scene for the timestamp "$T_i$," the augmented reality system 102 can determine if "T+1" is less than the prediction horizon "PH" in the act 410. If "$T_{i+1}$" is less than "PH," the augmented reality system 102 increments "$T_i$" by one (e.g., "Yes ($T_i=T_{i+1}$)") and repeats the acts 404-408 for the predicted field of view of the client device at the timestamp "$T_{i+1}$" in order to determine selection scores for the versions of the augmented reality objects at the timestamp "$T_{i+1}$."

Conversely, if "$T_{i+1}$" is more than "PH" (e.g., "No"), the augmented reality system 102 can make a final selection of versions of the augmented reality objects for the timestamp "$T_1$" (e.g., the current time) in an act 412. For example, the augmented reality system 102 can make the final selection based on the selection scores previously determined for each timestamp "$T_i$" from "$T_1$" to "PH" through the iterations of the acts 404-408, discussed above.

For example, in some embodiments, the augmented reality system 102 can combine the selection scores for each version of each object determined in the act 408. In this manner, the augmented reality system 108 can determine a selection score that reflects the current field of view and predicted fields of view up to the prediction horizon. Utilizing the combined selection scores, the augmented reality system 102 can make final selections of versions of objects to download using a variety of approaches.

For example, in some embodiments, the augmented reality system 102 utilizes a multi-choice knapsack approach to select versions of objects (e.g., to maximize a cumulative selection score subject to a download time constraint). In other embodiments, the augmented reality system ranks the selection scores and selects a threshold number to download based on the ranking (e.g., the top three versions of different objects). In other embodiments, the augmented reality system selects the versions of objects that satisfy a threshold selection score (e.g., selects versions of different objects having selection scores greater than 50).

Based on the final selection, the augmented reality system 102 generates a queue or listing of versions of augmented reality objects to request (e.g., from the augmented reality database 108). Additionally, in at least one embodiment, the augmented reality system 102 can rank the queue or listing based on selection scores (e.g., with the highest scoring version ranked first). With the ordered request queue or listing, the augmented reality system 102 requests the augmented reality objects from the queue or listing for display on the client device in the act 414.

The acts illustrated in FIG. 4 operate in connection with timestamps from "$T_1$" (e.g., the current time) to the prediction horizon "PH." In one or more embodiments, the augmented reality system 102 can repeat the acts illustrated in FIG. 4 for additional time periods. For example, upon downloading the selected versions of augmented reality objects at $T_1$, the augmented reality system 102 can repeat the acts 402-414 for a time $T_2$. Indeed, the augmented reality system can repeat the acts 402-414 at different times until the augmented reality scene is completely downloaded.

Furthermore, although FIG. 4 illustrates a particular order or arrangement of acts, the augmented reality system 102 can perform the acts of FIG. 4 in a different order, include additional acts, and/or remove acts. For example, in some embodiments, rather than repeating the acts 404-408, the augmented reality system 102 repeats the acts 404 to 406 for each timestamp (between "T" and "PH"), determines combined level of detail utility metrics and combined priority metrics, and then utilizes the combined level of detail utility metrics and the combined priority metrics to calculate selection scores in a single act. Similarly, although FIG. 4 illustrates the act 404 before the act 406, the augmented reality system 102 can perform the act 406 prior to the act 404.

Moreover, although not illustrated in FIG. 4, the augmented reality system 102 can also determine triggers corresponding to display of augmented reality objects and consider these triggering events in looking to projected fields of view. For example, some augmented reality objects will appear, move, or introduce different animations in response to different triggers. To illustrate, an augmented reality object can appear in response to the client device coming within a certain distance, the object appearing within a field of view, or a threshold amount of time elapsing.

In performing the acts 402-414, the augmented reality system 102 can consider these latent triggering events, and thus apply a trigger unwrapper in considering versions of augmented reality objects to download. For example, in performing the act 402, the augmented reality system 102 can predict that at time $T_2$, the client device will move within a threshold distance of a hidden augmented reality object. In response, the augmented reality object will appear at the time $T_2$. In response, at time $T_1$ the augmented reality object can determine a level-of-detail utility metric and a priority metric for the object for the time $T_2$ and consider these metrics in generating selection scores for the time $T_1$.

Figure 5:
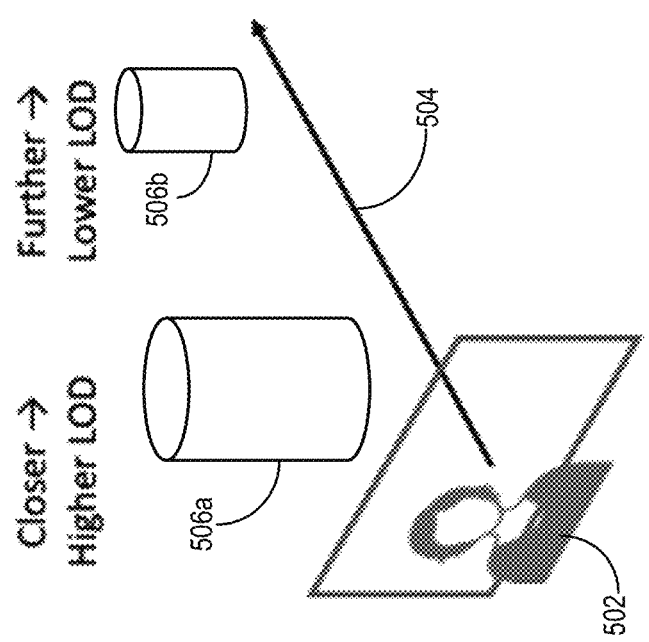
FIG. 5 illustrates determining level-of-detail utility metrics in accordance with one or more embodiments.

As discussed above, the augmented reality system 102 determines level-of-detail utility metrics for versions of augmented reality objects at augmented reality levels of detail. Additional detail is now provided with reference to FIG. 5 as to how the augmented reality system 102 determines a level-of-detail utility metric in accordance with one or more embodiments. As mentioned above, depending on the complexity of an augmented reality object and a distance of the object from the viewing client device, a higher level of detail for that object might only marginally contribute to an increase in visual quality of the augmented reality scene versus a lower level of detail for the same object. For example, as shown in FIG. 5, if the augmented reality system 102 provides the augmented reality object 506b at a high level of detail, the quality of perception of the augmented reality object 506b to the user 502 of the client device 112 would only be marginally increased because of the distance 504 between the client device 112 and the augmented reality object 506b. Conversely, also as shown in FIG. 5, if the augmented reality system 102 provides the augmented reality object 506a at a high level of detail, the quality of perception of the augmented reality object 506a to the user of the client device 112 may be substantially increased because the augmented reality object 506a is only a short distance from the client device 112.

The difference in quality perception also varies based on complexity of the object in question. For example, the cylinder shown in FIG. 5 is a relatively simple object. Accordingly, lower levels of detail will have less impact on the overall quality perception of the scene. In contrast, lower levels of detail with a complex object (e.g., an augmented reality dragon with a complicated surface) will have a significant impact on the overall quality perception for the scene. For example, as discussed above, an object's complexity is affected by the characteristics and factors associated with the object. If the augmented reality object is less complex, it may have a simple shape with fewer vertices and faces, as well as fewer colors, shadows, and shading. If the augmented reality object is more complex, it may have a complicated shape with a high number of internal vertices and faces, and multiple colors, shadows, and shades. Thus, a high level of detail for a highly complex object will increase the overall quality perception for the augmented reality scene, while a high level of detail for a simple object will only have a negligible impact on the overall quality perception for same scene.

To define the objective visual contribution of a particular level of detail of an augmented reality object, the augmented reality system 102 can utilize an error perception measure. The error perception measure can include a variety of metrics, such as a screen-space error, a world-space error, a quality contribution metric, or some other measure that reflects the perceived quality and/or error resulting from a particular level-of-detail. In one or more embodiments, the augmented reality system 102 utilizes a screen-space error associated with an augmented reality object at a level of detail that is defined as a difference in pixels/voxels/vertices (or other detail metric) ("p") between rendering on screen a lower level of detail rather than a higher level of detail. In at least one embodiment, the augmented reality system 102 determines the screen-space error p to depend on factors including the distance between the client device and the augmented reality object within the augmented reality scene, the resolution and field of view of the client device, and the geometric error of the augmented reality object at the level of detail (e.g., expressing the absolute distance between the vertices of the original, augmented reality object at its highest level of detail and the vertices of the version of the augmented reality object at its current level of detail—obtained via a process of decimation). For example, screen-space error can be written as:

$$\rho = \lambda \frac{\delta}{d},$$

where d is the distance between the client device and the augmented reality object, and $\lambda$ is a screen resolution parameter defined by $$\lambda = \frac{w}{\phi},$$

and w is the number of pixels along the field of view $\phi$.

The augmented reality system 102 can first compute the quality contribution $q_{ij}$ of each version j of the augmented reality object i at timestamp t (omitted for clarity), as in the following equation:

$$q_{ij} = \begin{cases} [1 + (\rho_{ij} - \rho^*)]^{-1} & \text{if } \rho_{ij} \geq \rho^* \\ 1 & \text{otherwise} \end{cases}$$

Where $\rho_{ij}$ is the screen-space error of the analyzed version of the augmented reality element j, and $\rho^*$ is a configurable target screen-space error value, which indicates the minimum screen space error below which any refinement of level of detail would not be perceivable by the user. In one or more embodiments, the quality contribution of the version of the augmented reality object is maximized when the screen-space error of the version of the augmented reality object is equal to or smaller than the target screen-space error. Conversely, the quality contribution of the version decreases as the screen-space error increases.

With the screen-space error determined, the augmented reality system 102 can further determine the level-of-detail utility metric for the version of the augmented reality object based on the following equation:

$$U_{ij} = \begin{cases} 0 & \text{if } (\rho_i \geq \rho^* \text{ or } \rho_i \geq \rho_{ij}) \\ q_{ij}/(1+\delta_{ij}) & \text{otherwise} \end{cases}$$

Where $\rho_i$ is the screen-space error of the version (e.g., level of detail) currently in view for the augmented reality object i, and $\delta_{ij}$ is the estimated download time in seconds, computed as a ratio between the size of the version of the augmented reality object and the estimated download time (or bandwidth available to the client device). If the version in view already satisfies the target screen-space error, it is not necessary to further upgrade the quality of the augmented reality object at the current time, and the augmented reality system 102 can set the utility metrics of all versions of the augmented reality object to zero. The augmented reality system 102 can also set the utility metric of the version j of the augmented reality object to zero if the screen-space error of the version in view of the client device is smaller than that of the version j (i.e., downloading the version j would reduce the augmented reality object visual quality). Otherwise, the augmented reality system 102 weights the quality contribution $q_{ij}$ by the download time necessary to fetch the specific version of the augmented reality object. This incorporates the trade-off between increasing quality and ensuring a timely delivery. It should be noted that the values utilized by the augmented reality system 102 in determining the screen-space error and level-of-detail utility metric associated with a version of an augmented reality system are dynamic. Particularly, both $\rho_{ij}$ and $\rho_i$ can change because of the movements of the client device in the augmented reality scene, while $\delta_{ij}$ depends on the available network resources.

As mentioned above, the augmented reality system 102 can determine a level-of-detail utility metric for the current field of view and predicted fields of view. Indeed, as discussed in FIG. 4, the augmented reality system 102 can utilize level-of-detail utility metrics for future timestamps to select versions of object reality objects at a current time.

The foregoing discussion provides an illustration of determining a level-of-detail utility metric in accordance with one or more embodiments. The augmented reality system 102 can utilize alternative approaches to determine a level-of-detail utility metric. For example, the augmented reality system 102 can determine the level-of-detail utility metric for the version of the augmented reality object based on historical data. For example, the augmented reality system 102 can utilize level-of-detail utility metrics previously calculated for the version of the augmented reality object in relation to other client devices to determine the current level-of-detail utility metric. Alternatively, the augmented reality system 102 can determine the level-of-detail utility metric by combining (e.g., multiplying, adding, weighting) a complexity measure for the augmented reality object and the distance between the position of the augmented reality object within the augmented reality scene and the position of the client device within the augmented reality scene.

Figure 6:
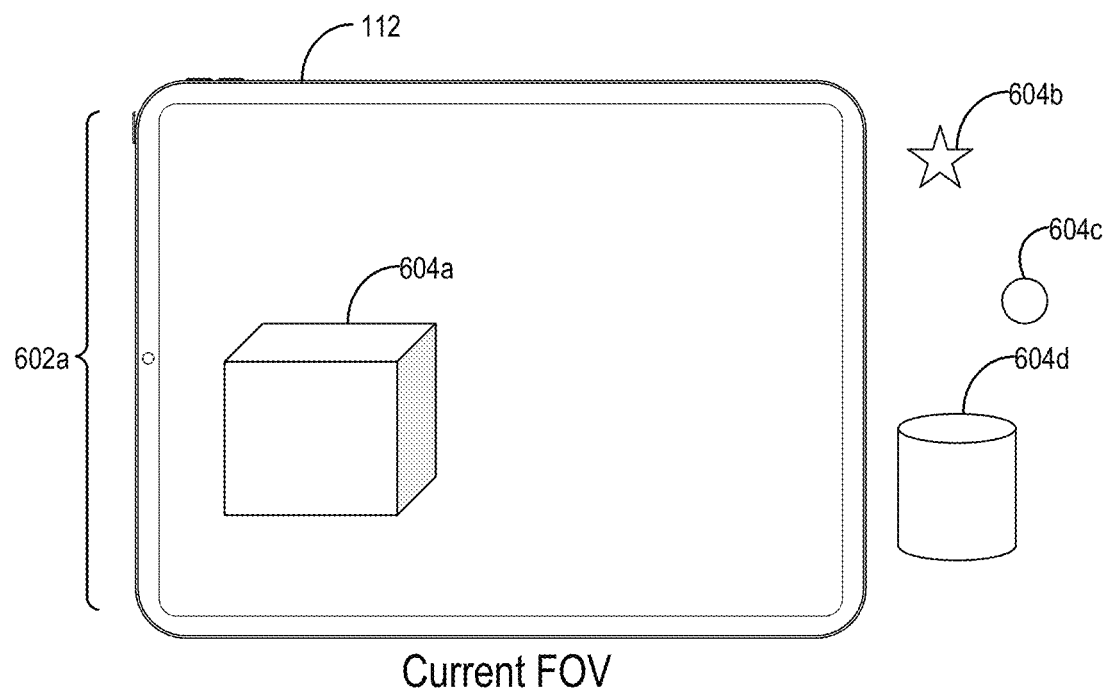
FIG. 6 illustrates an example of determining object priority metrics in accordance with one or more embodiments.

As discussed above, the augmented reality system 102 determines object priority metrics for augmented reality objects associated with an augmented reality scene. FIG. 6 provides additional information with regard to how the augmented reality system 102 determines object priority metrics in accordance with one or more embodiments. For example, as mentioned above and as shown in FIG. 6, the augmented reality system 102 can determine an object priority metric for an augmented reality object (e.g., the augmented reality object 604d among the other augmented reality objects 604a, 604b, and 604c) based on a current field of view 602 of the client device 112.

As just mentioned, the augmented reality system 102 can determine an object priority metric for an augmented reality object based on current and predicted fields of view associated with a client device. Accordingly, the augmented reality system 102 can determine an object priority metric "$P_i$" utilizing the following equation:

$$P_i = (1+A_i) \times \tilde{A}_i \times e^{-K\theta_i}$$

Where $A_i$ represents the area of the current (or projected) field of view of the client device 112 occupied by the augmented reality object, equal to 1 when the augmented reality object occupies the entire current (or projected) field of view. This value depends both on the distance and the physical size of the augmented reality object. The augmented reality system 102 computes this value as the area of the convex hull of the augmented reality object's bounding box. Alternatively, the augmented reality system 102 can compute the area of the current field of view occupied by the object as a percentage of pixels/voxels/vertices in the client device display taken up by the object. Alternatively, the augmented reality system 102 can compute the area of the current field of view as a number of pixels/voxels/vertices in the client device display taken up by the object.

In at least one embodiment, the equation above for determining the object priority metric "$P_i$" may further include a multiplicative term "$Z_i$." In one or more embodiments, the term $Z_i$ represents a weight specific to a number of zones associated with an augmented reality scene. For example, an augmented reality scene may be divided into multiple zones, each zone associated with an importance weight. To illustrate, the zone directly in front of the client device might have the highest importance weight, while the zone directly behind the client device (e.g., the camera of the client device is pointing away) might have the lowest importance weight. Additionally or alternative, zones that are farthest away from the client device might have the lowest importance weight. In one or more embodiments, the multiplicative term $Z_i$ allows the augmented reality system 102 to govern the inherent importance of objects belonging to same and/or different zones.

$A_i$ allows the augmented reality system 102 to prioritize augmented reality objects that are bigger and/or closer to the client device 112, and which therefore have a higher impact on the user's visual perception. $\tilde{A}_i$ indicates the potential area that would be occupied by the augmented reality object in the field of view of the client device 112 (i.e., the area that would result if the client device 112 would turn and point directly towards the augmented reality object). In at least one embodiment, $\tilde{A}_i$ keeps into account that rotational changes of the field of view can be faster than translational changes. In other words, the user of the client device 112 can explore a large portion of the (closer) augmented reality scene by rotating or pivoting the client device 112. Thus, $\tilde{A}_i$ allows the augmented reality system 102 to prioritize objects that could be relevant for the client device 112 in the near future, despite being currently outside the field of view of the client device 112. The augmented reality system 102 can determine the potential area that would be occupied by the augmented reality object as a percentage of pixels/voxels/vertices in the client device display taken up by the object. Alternatively, the augmented reality system 102 can compute the potential area as a number of pixels/voxels/vertices in the client device display taken up by the object.

Additionally, $e^{-K\theta_i}$ takes into account the angular distance between the client device's viewing direction and the center of the augmented reality object's bounding box, represented by $\theta_i$. Thus, the more the client device 112 would have to rotate to have a specific augmented reality object in the field of view, the lesser the importance of the augmented reality object, as its probability of being in view diminishes. For example, K may be fixed at seventy five degrees. In additional embodiments, K may be a variety of other values (e.g., 45 degrees, 60 degrees, or 90 degrees).

As mentioned above, the augmented reality system 102 can determine the object priority metric "$P_i$" for the current field of view and predicted fields of view. Indeed, as discussed in FIG. 4, the augmented reality system 102 can utilize object priority metrics for future timestamps to select versions of object reality objects at a current time.

As discussed above, the augmented reality system 102 utilizes an augmented reality object's level-of-detail utility metric and object priority metric to determine a selection score for the augmented reality object at a timestamp "$T_i$". The augmented reality system 102 can utilize the same approach to determine selection scores for the augmented reality object at additional timestamps until the prediction horizon "PH." In one or more embodiments, the augmented reality system 102 can then utilize an adaptation heuristic to identify the augmented reality objects and the level of detail for the augmented reality object to provide for download within a reaction time threshold based on the determined selection scores. In one or more embodiments, the adaptation heuristic of the augmented reality system 102 is an objective function that selects versions of augmented reality objects based on improving a cumulative or overall selection score for the versions of augmented reality objects, subject to a constraint of downloading the selected versions within the reaction time threshold. For example, the augmented reality system 102 can identify the versions of the augmented reality objects based on the determined selection scores utilizing a multi-choice knapsack approach, as in the following system of equations:

$$\max_{\alpha} \sum_i \sum_j \alpha_{ij} V_{ij} \text{ with } V_{ij} = P_i U_{ij}$$

$$\alpha_{ij} \in \{0; 1\} \, \forall \, i, j$$

$$\sum_j \alpha_{ij} \le 1 \, \forall \, i$$

$$\sum_i \sum_j \alpha_{ij} \delta_{ij} \le \Delta^*$$

Where $\alpha_{ij}$ represents the decision variable of the problem, equal to 1 when the level of detail version j of the augmented reality object i is selected for download, and 0 otherwise. In at least one embodiment, the objective of the adaptation heuristic is to maximize the cumulative value of the augmented reality object versions to request, where the value is given by the product of priority and utility metrics. The second constraint limits to one the number of level of detail versions per augmented reality object that can be downloaded. The third constraint indicates that the download of the selected versions of augmented reality objects should be completed in $\Delta^*$ seconds, with $\Delta^*$ representing the aforementioned minimum reaction time threshold. Alternatively, the augmented reality system 102 can utilize a different selection approach. As discussed above, the augmented reality system 102 can utilize a ranking approach or by selecting versions of augmented reality objects that satisfy a threshold selection score.

In some embodiments, if the augmented reality system 102 determines that the adaptation heuristic discussed above outputs an empty queue (e.g., fails to identify optimal versions of augmented reality objects to request for download), the augmented reality system 102 can request download of the version of an augmented reality object that has the highest total selection metric (e.g., a total of the selection metrics determined for the timestamps between the current time and the prediction horizon). Conversely, if the adaptation heuristic outputs a larger queue (e.g., greater than one) of versions of augmented reality objects, the augmented reality system 102 can sort the queue by descending selection metrics, and request download for the versions of the augmented reality objects in the order dictated by the sorted queue.

FIGS. 7A-7D illustrate an example of the augmented reality system 102 iteratively identifying, selecting, and providing versions of augmented reality objects at augmented reality levels of detail to a client device as the client device moves through the corresponding augmented reality scene. For example, at timestamp zero in FIG. 7A, the augmented reality system 102 has yet to receive a request for the augmented reality scene 702. Accordingly, the augmented reality system 102 has not identified or provided any augmented reality objects at any level of detail (e.g., indicated by the grey fill-in and empty level of detail indicators) for download to the client device 112 positioned in the center of the currently unviewable augmented reality scene 702.

Figure 7B:
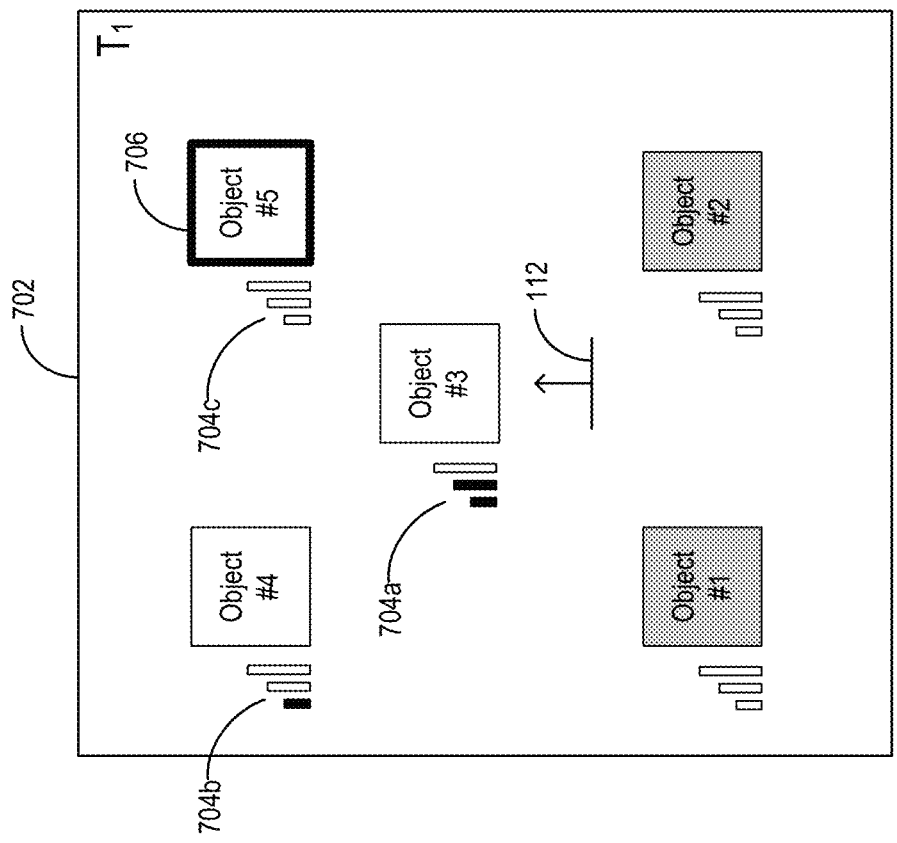
FIGS. 7A-7D illustrate iteratively selecting and providing versions of augmented reality objects in accordance with one or more embodiments.
Figure 7A:
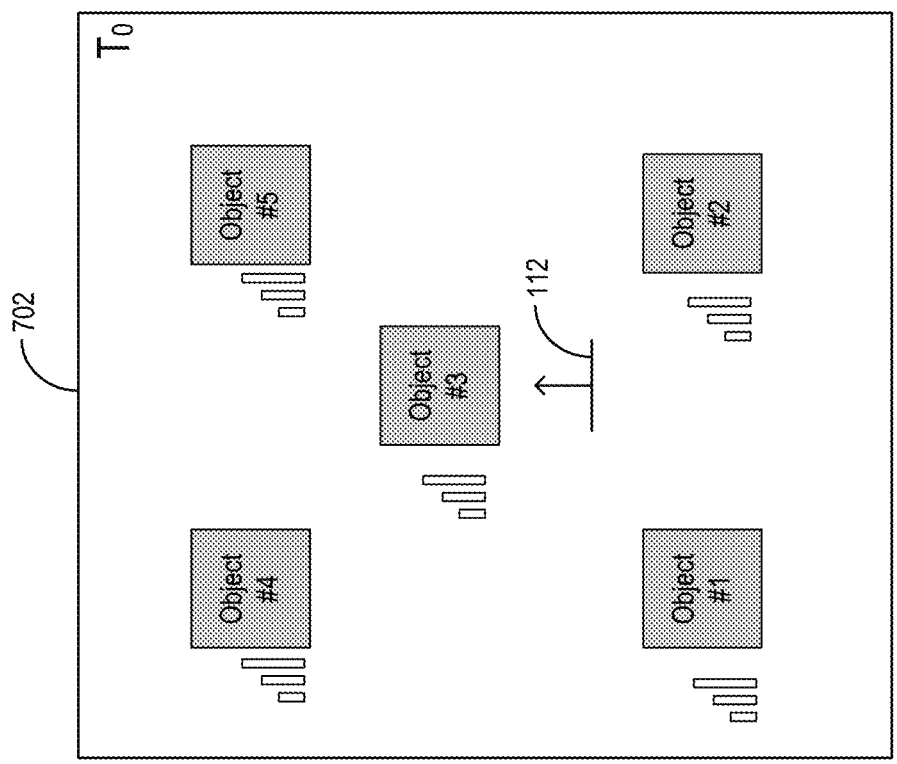

In FIG. 7B, and in response to receiving a request from the client device 112 for the augmented reality scene 702, the augmented reality system 102 can begin the process of iteratively identifying and providing augmented reality objects at varying levels of detail for download to the client device 112. For example, in response to receiving the request from the client device 112 for the augmented reality scene 702, the augmented reality system 102 can identify all of the versions of the objects #1-#5 associated with the augmented reality scene 702.

To illustrate, each of the augmented reality objects #1-#5 may be associated with three versions within the augmented reality database 108—one at a low level of detail, one at a medium level of detail, and one at a high level of detail. Accordingly, in response to receiving the request for the augmented reality scene 702 from the client device 112, the augmented reality system 102 can identify all of the versions of all of the augmented reality objects #1-#5 for a total of fifteen versions of augmented reality objects. In one or more embodiments, the augmented reality system 102 can identify the versions of the augmented reality objects associated with augmented reality scene 702 based on shared metadata (e.g., an augmented reality scene identifier) shared between the augmented reality scene 702 and the corresponding versions of the augmented reality objects therein. Additionally or alternatively, the augmented reality system 102 can identify the versions of the augmented reality objects based on pointers from a node associated with augmented reality scene 702 to nodes associated with the versions of the augmented reality objects. Additionally or alternatively, the augmented reality system 102 can identify the versions of the augmented reality objects based on a table lookup where the versions of the augmented reality objects are associated with a column or row corresponding to the augmented reality scene 702. Additionally or alternatively, the augmented reality system 102 can identify the versions of the augmented reality objects based on any other similar type of data storage scheme.

The augmented reality system 102 can further determine selection scores for each of the identified versions of the objects #1-#5 (e.g., from "$T_1$" to the prediction horizon). As discussed above in relation to FIGS. 3-6B, the augmented reality system 102 can determine selection scores for versions of augmented reality objects at "$T_1$" based on level-of-detail utility metrics and object priority metrics for the versions; taking into account the position and direction of the client device 112 within the augmented reality scene 702 at "$T_1$". The augmented reality system 102 can then iteratively determine selection scores for the versions of augmented reality objects at additional timestamps until a prediction horizon. The augmented reality system 102 then utilizes the determined selection scores across the timestamps from "$T_1$" to the prediction horizon to determine overall or cumulative selection scores for the versions of augmented reality objects.

To illustrate further, and returning to FIG. 7B, the augmented reality system 102 can determine level-of-detail utility metrics for the identified versions of the objects #1-#5 based on a calculated error perception measure (e.g., a screen-space error) for each of the versions of the objects #1-#5. As discussed above, the error perception measure for a version of an augmented reality object defines the objective visual contribution of that version of the augmented reality object depending on the distance between the client device 112 and the corresponding object position within the augmented reality scene 702, the resolution and field of view of the client device 112, and the complexities of the version of the object. The augmented reality system 102 further determines the level-of-detail utility metrics by weighting each determined error perception measure by the estimated download time for each version (in seconds), computed as a ratio between the size of the version and the estimated bandwidth available for the client device 112. Thus, it follows that, at time "$T_1$" as shown in FIG. 7B, the augmented reality system 102 can determine that the medium level of detail version of the augmented reality object #3 has the highest level-of-detail utility metric at least in part because the augmented reality object #3 is closest to the client device 112 within the augmented reality scene 702.

In addition to determining level-of-detail metrics for the fifteen versions of the augmented reality objects #1-#5 associated with the augmented reality scene 702, the augmented reality system 102 also determines object priority metrics for each of the augmented reality objects #1-#5. For example, as discussed above with regard to FIG. 6, the augmented reality system 102 can determine an object priority metric for augmented reality object #3 based on an area taken up by the augmented reality object #3 within the current field of view of the client device 112 within the augmented reality scene 702, an area that would be taken up by the augmented reality object #3 if the client device 112 were turned to face the augmented reality object #3 directly, and an angular distance between the current field of view (e.g., the viewing direction) of the client device 112 and the center of the augmented reality object #3. It follows that the augmented reality system 102 determines a high object priority metric for the augmented reality object #3 because that object occupies most of the current field of view of the client device 112 and has an angular distance of zero (e.g., because it is directly in front of the client device 112).

Similarly, the augmented reality system 102 determines mid-range object priority metrics for the augmented reality objects #4 and #5 because those objects only take up a fraction of the current field of view of the client device 112, but may take up a greater area of the view of the client device 112 if the client device 112 turned to face those objects directly. Additionally, the augmented reality system 102 can determine low or zero object priority metrics for the augmented reality objects #1 and #2 because those objects are not in the current field of view of the client device 112, and have a high angular distance from the current viewing direction of the client device 112.

With the level-of-detail utility metrics and object priority metrics determined for the versions of the augmented reality objects #1-#5 within the augmented reality scene 702 at "$T_1$," the augmented reality system 102 can determine selection scores for the fifteen versions. For example, as discussed above, the augmented reality system 102 can combine the level-of-detail utility metric and the object priority metric for a particular version of the augmented reality object #1 to determine the selection score for that version at "$T_1$." The augmented reality system 102 can then repeat the same determinations for that version of the augmented reality object #1 over additional timestamps until a prediction horizon in order to generate a number of selection scores for that version. The augmented reality system 102 can then determine a cumulative selection score for the version of the augmented reality object #1 based on the generated selection scores.

After repeating that process for all the versions of the augmented reality objects #1-#5, the augmented reality system 102 can utilize the adaptation heuristic in connection with the cumulative selection scores to identify the best version of each of the augmented reality object #1-#5 to provide for download within a reaction time threshold. Based on the output of the adaptation heuristic (e.g., an ordered queue of versions of one or more of the augmented reality objects #1-#5 to request for download), the augmented reality system 102 can determine to provide the medium level of detail version of object #3 (e.g., indicated by the version bars 704a of the version bars 704a, 704b, 704c, 704d, and 704e), and the low level of detail version of object #4 (e.g., indicated by the version bars 704b) for download to the client device 112 at "$T_1$" with a version of object #5 queued for download next (e.g., shown by the download indicator 706 around object #5). Due to low level-of-detail utility metrics and low object priority metrics, the augmented reality system 102 may not provide any version of the objects #1 and #2 for download to the client device 112 at "$T_1$" (e.g., indicated by the greyed-out boxes). Additionally or alternatively, the augmented reality system 102 may not provide any version of the objects #1 and #2 for download to the client device 112 because downloading these objects might exceed the reaction time threshold of the adaptation heuristic.

Figure 7D:
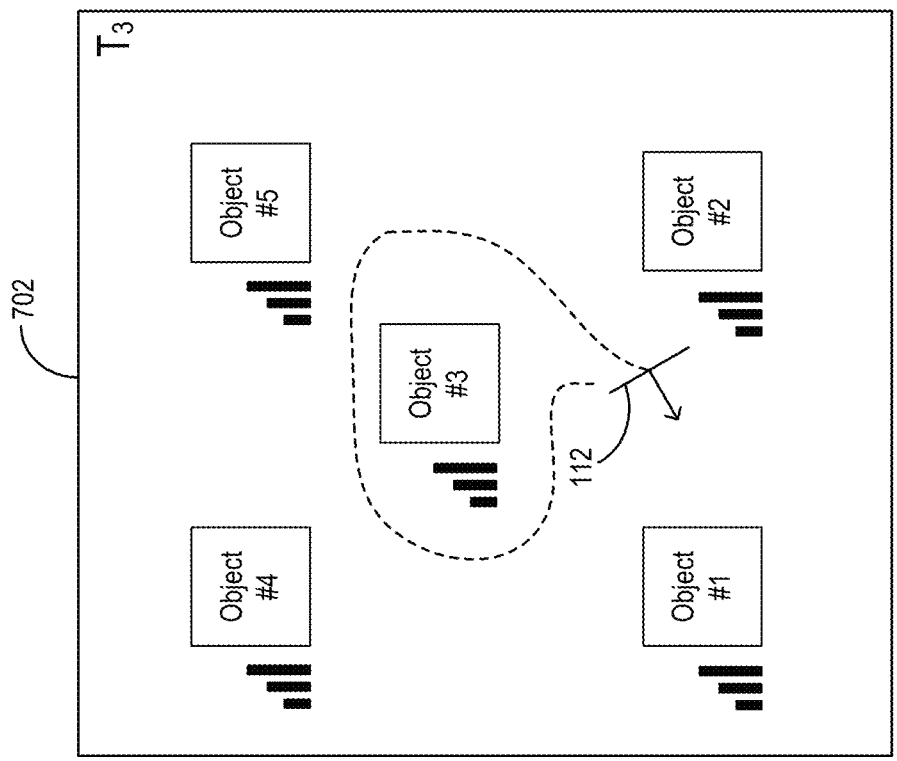
Figure 7C:
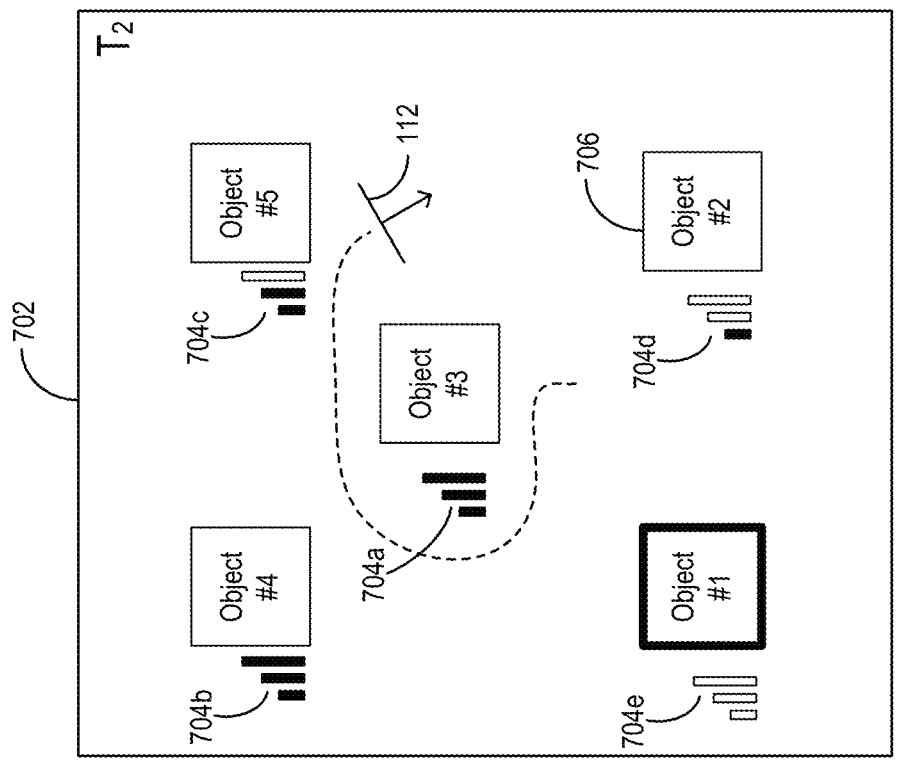

As the client device 112 moves through the augmented reality scene 702 at progressive timestamps the augmented reality system 102 can iteratively identify and provide additional versions of augmented reality objects. For example, as shown in FIG. 7C, as the client device 112 moves through the augmented reality scene 702 (e.g., indicated by the dashed line), the augmented reality system 102 can repeat the steps discussed above to provide additional versions of the augmented reality objects #1-#5 for download. For instance, at "$T_2$," the augmented reality system 102 can select and provide for download the high level of detail version of the object #3, the high level of detail version of the object #4, the medium level of detail version of the object #5, and the low level of detail version of the object #2, while queueing the object #1 for next download. Finally, at "$T_3$," as shown in FIG. 7D, the augmented reality system 102 completes download of the augmented reality scene 702 by selecting and providing for download the high level of detail version of the object #5, the high level of detail version of the object #2, and the high level of detail version of the object #1.

Although not illustrated in FIGS. 7A-7D, as mentioned above, one or more of the augmented reality objects #1-#5 may be associated with a trigger (e.g., a triggering event). In one or more embodiments, the augmented reality system 102 can download augmented reality objects based on overall or cumulative selection scores, as discussed above, and then provide the augmented reality objects for display on the client device 112 in response to one or more triggers associated with the augmented reality objects. For example, in an alternative embodiment, the augmented reality object #1 may be associated with a triggering event, such as the client device coming within a certain distance, the object appearing within a field of view, or a threshold amount of time passing. The augmented reality system 102 can download the augmented reality object #1 based on its selection score (including consideration of future fields of view after the trigger causes the augmented reality object #1 to surface/appear).

Figure 8:
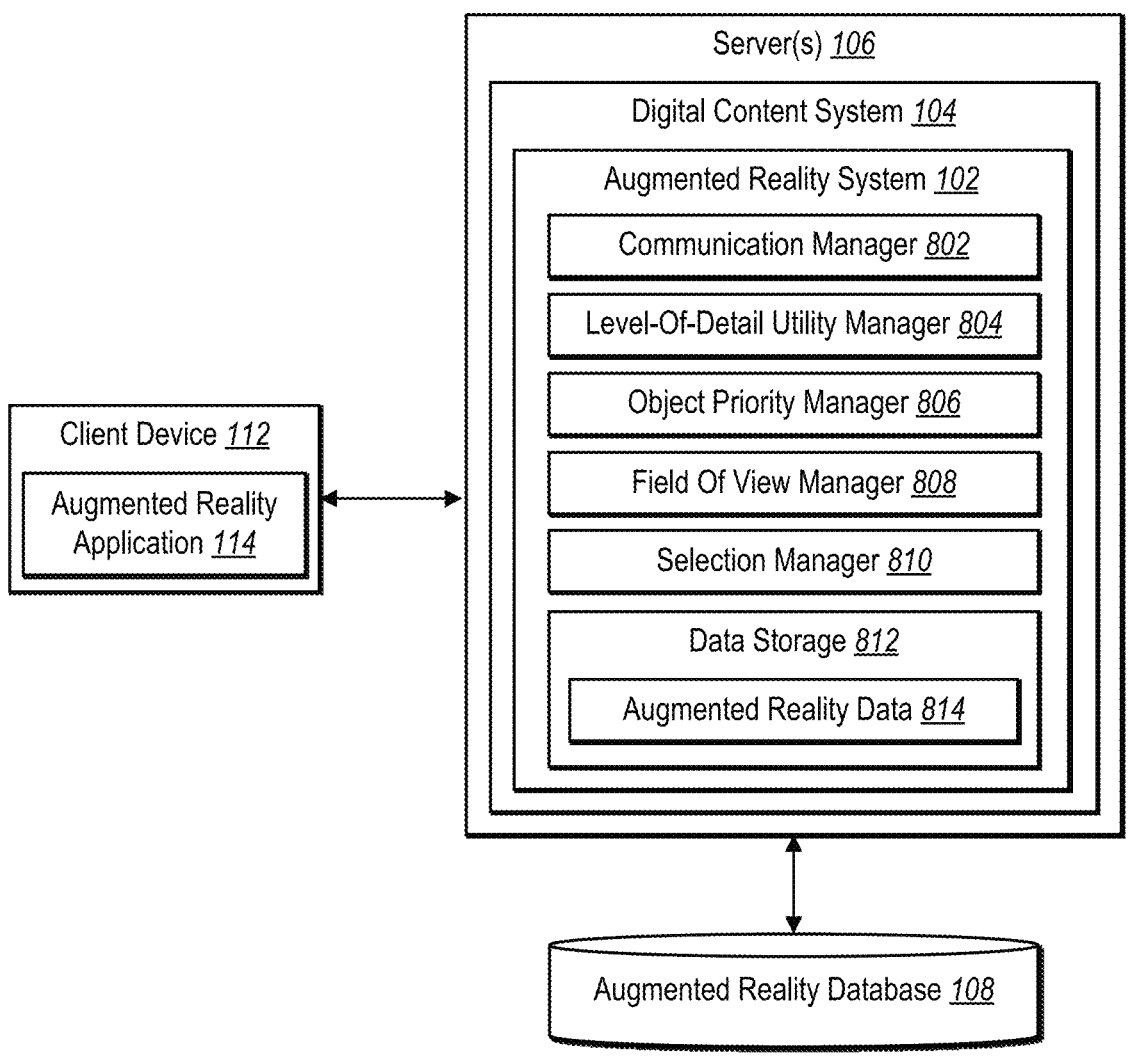
FIG. 8 illustrates a schematic diagram of the augmented reality system in accordance with one or more embodiments.

As described in relation to FIGS. 1-7D, the augmented reality system 102 iteratively selects and provides augmented reality objects for download to a client device. FIG. 8 illustrates a detailed schematic diagram of an embodiment of the augmented reality system 102 described above. Although illustrated on the server(s) 106, as mentioned above, the augmented reality system 102 can be implemented by one or more different or additional computing devices (e.g., the client device 112). In one or more embodiments, the augmented reality system 102 includes a communication manager 802, a level-of-detail utility manager 804, an object priority manager 806, a field of view manager 808, a selection manager 810, and a data storage 812 including augmented reality data 814.

Each of the components 802-812 of the augmented reality system 102 can include software, hardware, or both. For example, the components 802-812 can include one or more instructions stored on a computer-readable storage medium and executable by processors of one or more computing devices, such as a client device or server device. When executed by the one or more processors, the computer-executable instructions of the augmented reality system 102 can cause the computing device(s) to perform the methods described herein. Alternatively, the components 802-812 can include hardware, such as a special-purpose processing device to perform a certain function or group of functions. Alternatively, the components 802-812 of the augmented reality system 102 can include a combination of computer-executable instructions and hardware.

Furthermore, the components 802-812 of the augmented reality system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-812 may be implemented as a stand-alone application, such as a desktop or mobile application. Furthermore, the components 802-812 may be implemented as one or more web-based applications hosted on a remote server. The components 802-812 may also be implemented in a suite of mobile device applications or "apps." To illustrate, the components 802-812 may be implemented in an application, including but not limited to ADOBE CREATIVE CLOUD, such as ADOBE AERO, ADOBE PHOTOSHOP, ADOBE ACROBAT, ADOBE ILLUSTRATOR, and ADOBE INDESIGN. "ADOBE", "CREATIVE CLOUD," "AERO," "PHOTOSHOP," "ACROBAT," "ILLUSTRATOR," and "INDESIGN" are either registered trademarks or trademarks of Adobe Inc. in the United States and/or other countries.

As mentioned above, and as shown in FIG. 8, the augmented reality system 102 includes a communication manager 802. In one or more embodiments, the communication manager 802 handles communications between the augmented reality system 102 and other computing devices. For example, the communication manager 802 can send and receive information to and from the client device 112. To illustrate, the communication manager 802 can provide versions of augmented reality objects to the client device 112. The communication manager 802 can also receive information from the client device 112 such as a user selection of an augmented reality scene, and movement signals (e.g., GPS information, gyroscopic information). As mentioned above, in one or more embodiments, the communication manager 802 can send and receive information to the client device 112 via the augmented reality application 114 installed on the client device 112.

As mentioned above, and as shown in FIG. 8, the augmented reality system 102 includes a level-of-detail utility manager 804. In one or more embodiments, the level-of-detail utility manager 804 determines a level-of-detail utility metric for a version of an augmented reality object utilizing information including the complexity of the version of the augmented reality object, and the distance between the augmented reality object and the client device 112 within the augmented reality scene. In at least one embodiment, the level-of-detail utility manager 804 determines level-of-detail metrics for all versions of all augmented reality objects associated with a requested augmented reality scene at each timestamp from a current time until a prediction horizon (e.g., a future time).

Also as mentioned above, the augmented reality system 102 includes an object priority manager 806. In one or more embodiments, the object priority manager 806 determines an object priority metric for an augmented reality object within an augmented reality scene utilizing information including an area of the current field of view occupied by the augmented reality object, a potential area of the client device's field of view that would be taken up by the augmented reality object if the client device was turned and pointed directly toward the augmented reality object, and an angular distance between the current direction of the client device 112 and the center of the augmented reality object. Additionally, the object priority manager 806 can further determine an object priority metric for an augmented reality object based on a zone in which the augmented reality object is positioned within the augmented reality scene, and the position of the client device relative to that zone. In at least one embodiment, the object priority manager 806 determines object priority metrics for all the augmented reality objects associated with a requested augmented reality scene at each timestamp from a current time until a prediction horizon.

Furthermore, as shown in FIG. 8, the augmented reality system 102 includes a field of view manager 808. In one or more embodiments, the field of view manager 808 determines a current field of view for the client device 112, and a predicted field of view for the client device 112 at a future time. For example, the field of view manager 808 can determine the current field of view of the client device 112 based on signals from the client device 112 including visual signals (e.g., a stream of camera frames), orientation signals (e.g., landscape or portrait), and active camera signals (e.g., front or rear facing). Additionally, the field of view manager 808 can determine a predicted field of view of the client device 112 based on movement signals from the client device 112 including speed and direction signals.

As mentioned above, and as shown in FIG. 8, the augmented reality system 102 includes a selection manager 810. In one or more embodiments, the selection manager 810 identifies versions of augmented reality objects to provide for download to the client device 112 based on level-of-detail utility metrics, object priority metrics, and the reaction time threshold. As discussed above, the selection manager 810 can determine selection scores for versions of augmented reality objects at timestamps between a current time and a prediction horizon based on level-of-detail utility metrics and object priority metrics for the versions of augmented reality objects. In one or more embodiments, the selection manager 810 can then determine an overall or cumulative selection score for the versions of augmented reality objects based on the selection scores iteratively determined at the timestamps between the current time and the prediction horizon. For example, the selection manager 810 can determine the overall or cumulative selection score for a version of an augmented reality object by combining the iteratively determined selection scores (e.g., by adding the iteratively determined selection scores, by multiplying the iteratively determined selection scores, by selecting the highest of the iteratively determined selection scores). Based on cumulative or overall selection scores, the selection manager 810 can generate a queue of versions of augmented reality objects to request for download to the client device 112.

As mentioned above, and as shown in FIG. 8, the augmented reality system 102 includes the data storage 812. In one or more embodiments, the data storage 812 (via one or more memory devices) handles storage, retrieval, and maintenance of augmented reality data within the augmented reality database 108. For example, the data storage 812 can store and retrieve augmented reality objects associated with augmented reality scenes. In at least one embodiment, the data storage 812 can temporarily store all versions of augmented reality object associated with an augmented reality scene during analysis for selection of a set of the version as the augmented reality data 814.

Figure 9:
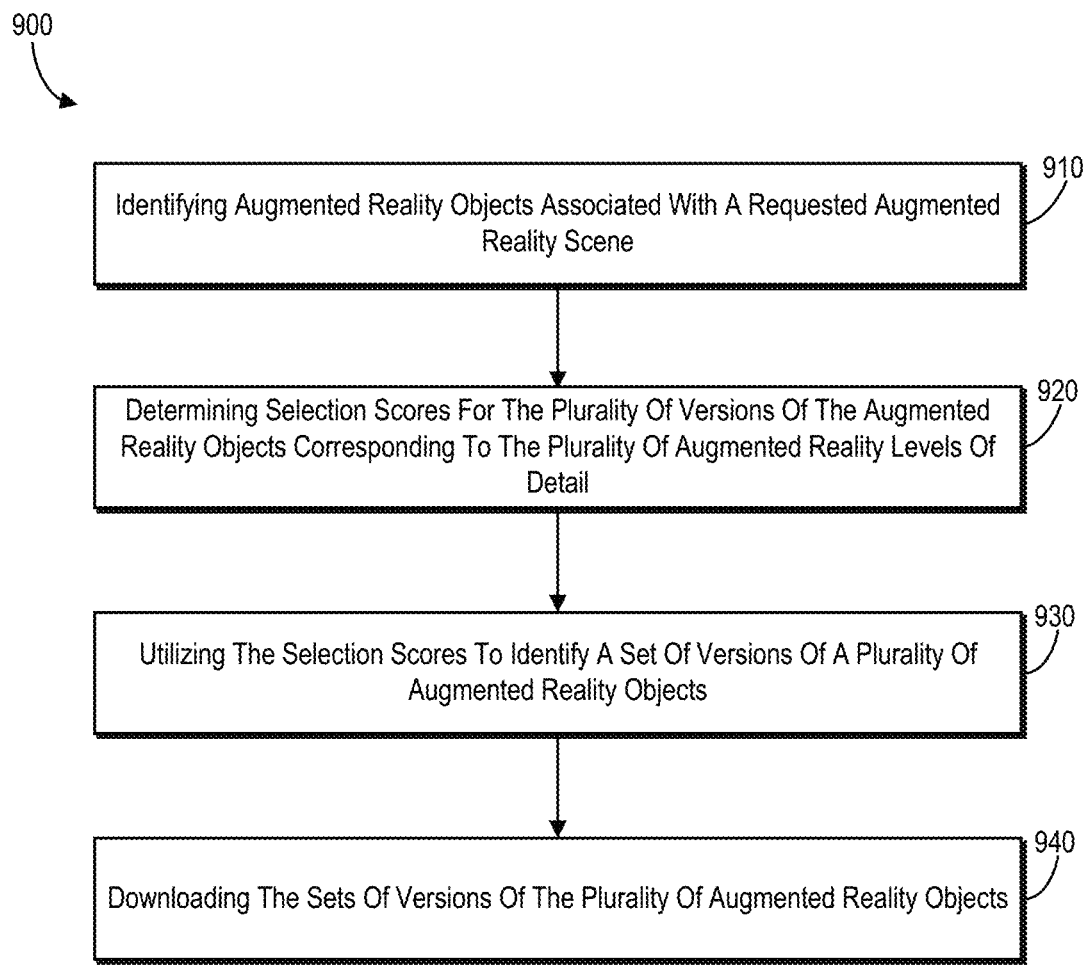
FIG. 9 illustrates a flowchart of a series of acts for identifying versions of augmented reality objects associated with an augmented reality scene for download to a client device in accordance with one or more embodiments.
Figure 10:
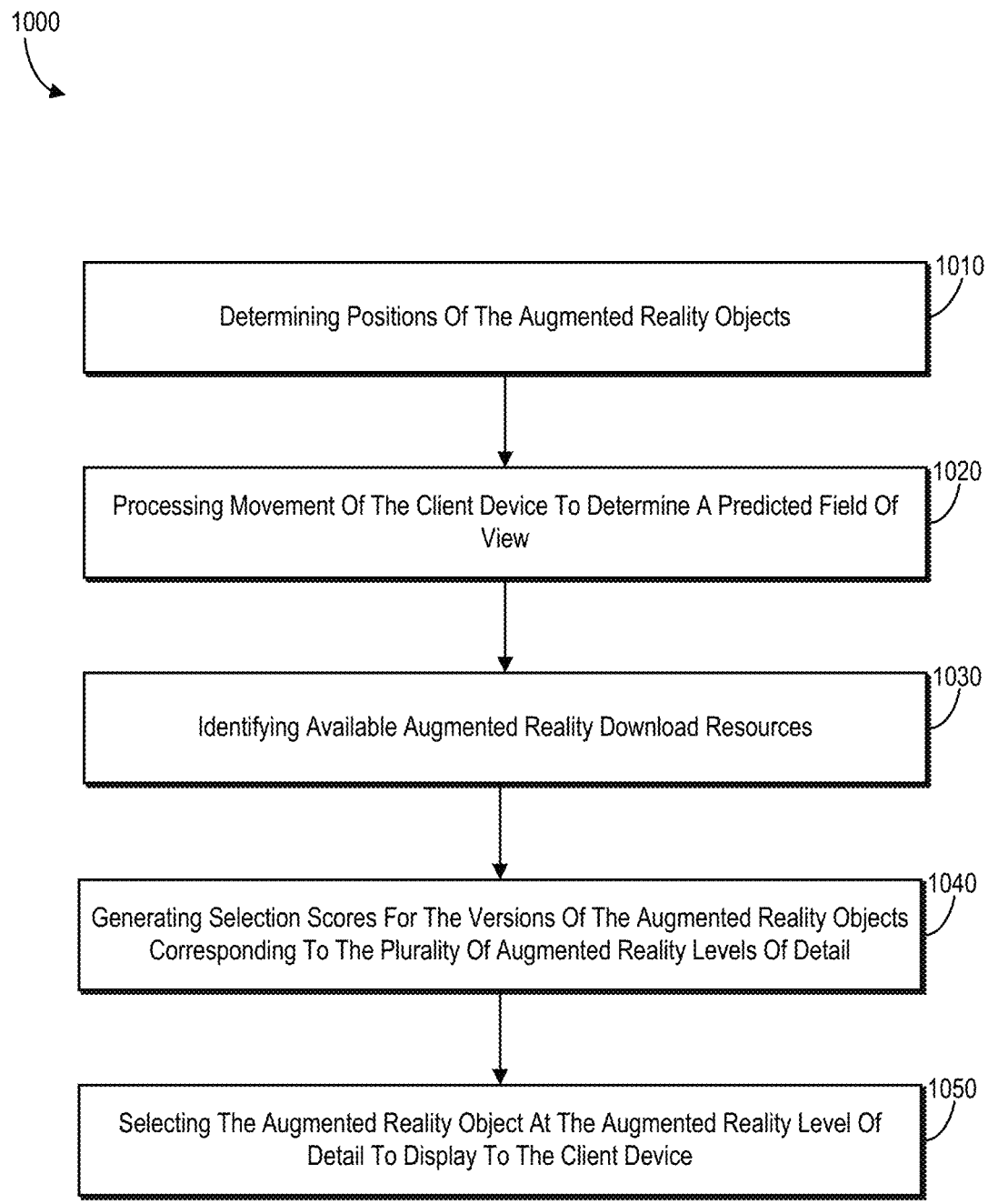
FIG. 10 illustrates a flowchart of a series of acts for selecting a version of an augmented reality object at an augmented reality level of detail to display to a client device in accordance with one or more embodiments.

FIGS. 1-8, the corresponding text, and the examples provide a number of different methods, systems, devices, and non-transitory computer-readable media of the augmented reality system 102. In addition to the foregoing, one or more embodiments can also be described in terms of flowcharts comprising acts for accomplishing a particular result, as shown in FIGS. 9 and 10. FIGS. 9 and 10 may be performed with more or fewer acts. Further, the acts may be performed in differing orders. Additionally, the acts described herein may be repeated or performed in parallel with one another or parallel with different instances of the same or similar acts.

As mentioned, FIG. 9 illustrates a flowchart of a series of acts 900 for identifying versions of augmented reality objects associated with an augmented reality scene for download to a client device. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown in FIG. 9, the series of acts 900 includes an act 910 of identifying augmented reality objects associated with a requested augmented reality scene. For example, the act 910 can involve identifying augmented reality objects associated with an augmented reality scene requested by a client device, each of the augmented reality objects having a plurality of versions corresponding to a plurality of augmented reality levels of detail. In one or more embodiments, the augmented reality objects include a first augmented reality object at a first level of detail and a second augmented reality object at a second level of detail different than the first level of detail.

Additionally, the series of acts 900 includes an act 920 of determining selection scores for the plurality of versions of the augmented reality objects corresponding to the plurality of augmented reality levels of detail. For example, the act 920 can involve determining selection scores for the plurality of versions of the augmented reality objects corresponding to the plurality of augmented reality levels of detail based on positions of the augmented reality objects within the augmented reality scene relative to the client device, predicted fields of view corresponding to the client device, and available augmented reality download resources.

In one or more embodiments, the series of acts further includes generating level-of-detail utility metrics for the plurality of versions of the augmented reality objects by: determining error perception measures associated with the plurality of versions of the augmented reality objects, based on complexities of the plurality of versions of the augmented reality objects and distances between the augmented reality objects and the client device within the augmented reality scene; determining download times corresponding to the plurality of versions of the augmented reality objects and the client device; and generating the level-of-detail utility metrics for the plurality of versions of the augmented reality objects by comparing the error perception measures and the download times.

Additionally, in at least one embodiment, the series of acts further includes generating object priority metrics for the augmented reality objects by: determining a current field of view associated with the client device at a current time; determining areas of the current field of view that are taken up by the augmented reality objects; determining potential areas of the current field of view that would be taken up by the augmented reality objects if the client device was turned and pointed directly at the augmented reality objects; and determining the object priority metrics based on the areas of the current field of view, the potential areas of the current field of view, and angular distances between a direction of the current field of view and the augmented reality objects.

In one or more embodiments, the series of acts further includes determining the selection scores for the plurality of versions of the augmented reality objects by combining the level-of-detail utility metrics and the object priority metrics.

Additionally, the series of acts 900 includes an act 930 of utilizing the selection scores to identify a set of versions of a plurality of augmented reality objects. For example, the act 930 can involve utilizing the selection scores to identify the set of versions of the plurality of augmented reality objects at the levels of detail by applying an objective function that selects versions of augmented reality objects based on improving a cumulative selection score for the versions of augmented reality objects subject to a constraint of downloading the selected versions within the reaction time threshold. Additionally, the series of acts can include providing, for display on the client device, the downloaded sets of versions of the plurality of augmented reality objects at the levels of detail within the reaction time threshold.

Moreover, the series of acts 900 includes an act 940 of downloading the sets of versions of the plurality of augmented reality objects. For example, the act 940 can involve downloading the set of versions of the plurality of augmented reality objects at the levels of detail. In one or more embodiments, the set of versions is smaller than the total number of versions associated with the requested augmented reality scene. For example, downloading the set of versions of the plurality of augmented reality objects at the levels of detail can include downloading the set of versions of augmented reality objects without downloading an additional augmented reality object from the plurality of augmented reality objects.

In at least one embodiment, the series of acts includes, in response to determining that a threshold amount of time has passed since generating the level-of-detail utility metrics for the versions of the augmented reality objects, generating updated level-of-detail utility metrics for the versions of the augmented reality objects and updated object priority metrics for the augmented reality objects. Additionally or alternatively, the series of acts can include generating updated level-of-detail utility metrics for the versions of the augmented reality objects and updated object priority metrics for the augmented reality objects in response to determining that one or more versions of the augmented reality objects have been downloaded to the client device.

Additionally, the series of acts can include determining updated selection scores for the plurality of versions of the augmented reality objects corresponding to the plurality of augmented reality levels of detail by combining the updated level-of-detail utility metrics, the updated object priority metrics, and the reaction time threshold. Moreover, the series of acts can include utilizing the updated selection scores to identify an updated set of versions of the plurality of augmented reality objects to provide for display within the augmented reality scene via the client device.

As mentioned, FIG. 10 illustrates a flowchart of a series of acts 1000 for selecting a version of an augmented reality object at an augmented reality level of detail to display to a client device. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

As shown in FIG. 10, the series of acts 1000 includes an act 1010 of determining positions of the augmented reality objects. For example, the act 1010 can involve determining positions of the augmented reality objects with regard to a current field of view of the client device within the augmented reality scene. Additionally, in at least one embodiment, the act 1010 can include identifying animations and/or triggers (e.g., proximity of client device) associated with the augmented reality objects within the augmented reality scene. For example, the act 1010 can include identifying a trigger associated with an augmented reality element and predicting, based on the current and predicted fields of view of the client device, when the trigger associated with the augmented reality element will be activated.

Additionally, the series of acts 1000 includes an act 1020 of processing movement of the client device to determine a predicted field of view. For example, the act 1020 can involve processing movement of the client device to determine a predicted field of view corresponding to the client device for a future time. For example, determining a predicted field of view corresponding to the client device for a future time can include: determining a current position of the client device and current view direction of the client device; identifying movement signals associated with the client device within six degrees-of-freedom; and determining the predicted field of view corresponding to the client device based on the current position, the current view direction, and the identified movement signals.

Furthermore, the series of acts 1000 includes an act 1030 of identifying available augmented reality download resources. For example, the act 1030 can involve identifying available augmented reality download resources corresponding to the client device including available network bandwidth, client device processing capacity, and augmented reality scene data size.

The series of acts 1000 further includes an act 1040 of generating selection scores for the versions of the augmented reality objects corresponding to the plurality of augmented reality levels of detail. For example, the act 1040 can involve generating selection scores for the versions of the augmented reality objects corresponding to the plurality of augmented reality levels of detail based on the positions of the augmented reality objects with regard to the current field of view, the predicted field of view corresponding to the client device for the future time, and available augmented reality download resources.

Additionally, the series of acts 1000 includes an act 1050 of selecting the augmented reality object at the augmented reality level of detail to display to the client device. For example, the act 1050 can involve selecting the augmented reality object at the augmented reality level of detail to display to the client device by comparing the selection scores for the versions of the augmented reality objects corresponding to the plurality of augmented reality levels of detail. In at least one embodiment, selecting the version of the augmented reality object at the augmented reality level of detail to display to the client device involves: generating a level-of-detail utility metric for the version of the augmented reality object; generating an object priority metric for the augmented reality object; and determining a selection score, of the selection scores, for the version of the augmented reality object by combining the level-of-detail utility metric, the object priority metric, and a reaction time threshold.

In one or more embodiments, the series of acts 1000 include in response to determining that a threshold amount of time has passed since selecting the version of augmented reality object at the augmented reality level of detail, select an updated version of the augmented reality object at an updated augmented reality level of detail to display to the client device. For example, selecting the updated version of the augmented reality object at the updated augmented reality level of detail can include: determining updated positions of the augmented reality objects with regard to an updated field of view of the client device within the augmented reality scene; processing updated movement of the client device to determine an additional predicted field of view; and generating updated selection scores for the versions of the augmented reality objects corresponding to the plurality of augmented reality levels of detail based on the updated positions of the augmented reality objects with regard to the updated field of view and the additional predicted field of view.

Additionally, selecting the updated version of the augmented reality object at the updated augmented reality level of detail can involve comparing the updated selection scores for the versions of the augmented reality objects corresponding to the plurality of augmented reality levels of detail. For example, selecting the augmented reality object at the updated augmented reality level of detail can include selecting the version of the augmented reality object at a higher level of detail in response to determining that the client device is moving closer to the augmented reality object within the augmented reality scene. Additionally or alternatively, the series of acts 1000 can include select an updated version of the augmented reality object at an updated augmented reality level of detail to display to the client device in response to determining that a version of the augmented reality object has been downloaded to the client device.

In addition (or in the alternative) to the acts described above, in some embodiments, the series of acts 900 and/or the series of acts 1000 include performing a step for selecting augmented reality objects at augmented reality levels of detail. For instance, the algorithms and acts described in relation to FIG. 3 or 4 can comprise the corresponding acts for a step for selecting augmented reality objects at augmented reality levels of detail. Similarly, the algorithms and acts described in relation to FIGS. 5 and 6 can comprise the corresponding acts for a step for selecting augmented reality objects at augmented reality levels of detail.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
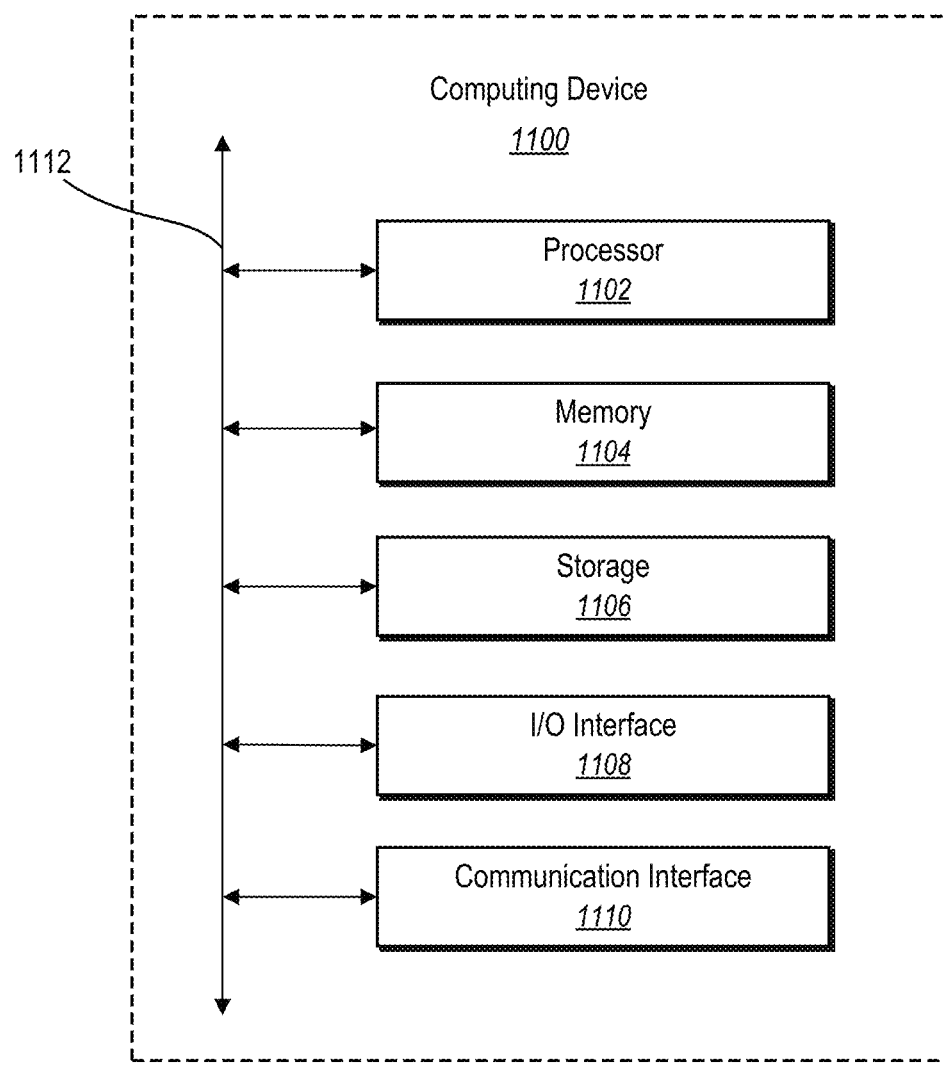
FIG. 11 illustrates a block diagram of an example computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., the server(s) 106, and the client device 112). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable storage medium storing instructions thereon that, when executed by at least one processor, cause a computer system to:
    identify augmented reality objects associated with an augmented reality scene requested by a client device, each of the augmented reality objects having a plurality of versions corresponding to a plurality of augmented reality levels of detail;
    determine selection scores for the plurality of versions of the augmented reality objects corresponding to the plurality of augmented reality levels of detail based on positions of the augmented reality objects within the augmented reality scene relative to the client device, a current view direction and predicted fields of view corresponding to the client device, and available augmented reality download resources within a reaction time threshold;
    utilize the selection scores to identify a set of versions of a plurality of augmented reality objects at levels of detail from the plurality of versions of the augmented reality objects corresponding to the plurality of augmented reality levels of detail to provide for display within the augmented reality scene via the client device; and
    download the set of versions of the plurality of augmented reality objects at the levels of detail.

2. The non-transitory computer-readable storage medium as recited in claim 1, wherein the identified augmented reality objects comprise a first augmented reality object at a first level of detail and a second augmented reality object at a second level of detail different than the first level of detail.

3. The non-transitory computer-readable storage medium as recited in claim 1, further storing instructions thereon that, when executed by the at least one processor, cause the computer system to generate level-of-detail utility metrics for the plurality of versions of the augmented reality objects by:
    determining error perception measures associated with the plurality of versions of the augmented reality objects, based on complexities of the plurality of versions of the augmented reality objects and distances between the augmented reality objects and the client device within the augmented reality scene;
    determining download times corresponding to the plurality of versions of the augmented reality objects and the client device; and
    generating the level-of-detail utility metrics for the plurality of versions of the augmented reality objects by comparing the error perception measures and the download times.

4. The non-transitory computer-readable storage medium as recited in claim 3, further storing instructions thereon that, when executed by the at least one processor, cause the computer system to generate object priority metrics for the augmented reality objects by:
    determining a current field of view associated with the client device at a current time;
    determining areas of the current field of view taken up by the augmented reality objects;
    determining potential areas of the current field of view taken up by the augmented reality objects if the client device was pointed at the augmented reality objects; and
    determining the object priority metrics based on the areas of the current field of view, the potential areas of the current field of view, and angular distances between a direction of the current field of view and centers of the augmented reality objects.

5. The non-transitory computer-readable storage medium as recited in claim 4, further storing instructions thereon that, when executed by the at least one processor, cause the computer system to determine the selection scores for the plurality of versions of the augmented reality objects by combining the level-of-detail utility metrics and the object priority metrics.

6. The non-transitory computer-readable storage medium as recited in claim 5, further comprising instructions that, when executed by the at least one processor cause the computer system to utilize the selection scores to identify the set of versions of the plurality of augmented reality objects at the levels of detail by applying an objective function that selects versions of augmented reality objects based on improving a cumulative selection score for the versions of augmented reality objects subject to a constraint of downloading the selected versions within the reaction time threshold.

7. The non-transitory computer-readable storage medium as recited in claim 6, further storing instructions thereon that, when executed by the at least one processor, cause the computer system to provide, for display on the client device, the downloaded sets of versions of the plurality of augmented reality objects at the levels of detail within the reaction time threshold.

8. The non-transitory computer-readable storage medium as recited in claim 1, further storing instruction thereon that, when executed by the at least one processor, cause the computer system to, in response to determining that an object has been downloaded or that a threshold amount of time has passed since generating level-of-detail utility metrics for the plurality of versions of the augmented reality objects, generate updated level-of-detail utility metrics for the plurality of versions of the augmented reality objects and updated object priority metrics for the augmented reality objects.

9. The non-transitory computer-readable storage medium as recited in claim 8, further storing instructions thereon that, when executed by the at least one processor, cause the computer system to determine updated selection scores for the plurality of versions of the augmented reality objects corresponding to the plurality of augmented reality levels of detail by combining the updated level-of-detail utility metrics, the updated object priority metrics, and the reaction time threshold.

10. The non-transitory computer-readable storage medium as recited in claim 9, further storing instructions thereon that, when executed by the at least one processor, cause the computer system to utilize the updated selection scores to identify an updated set of versions of the plurality of augmented reality objects to provide for display within the augmented reality scene via the client device.

11. A system comprising:
one or more memory devices comprising augmented reality objects of an augmented reality scene, the augmented reality objects comprising a plurality of versions corresponding to a plurality of augmented reality levels of detail; and
one or more server devices configured to cause the system to:
select, from the plurality of versions of the augmented reality objects corresponding to the plurality of augmented reality levels of detail, a version of an augmented reality object at an augmented reality level of detail to display to a client device by:
determining positions of the augmented reality objects with regard to a current field of view of the client device within the augmented reality scene;
processing movement of the client device to determine a predicted field of view corresponding to the client device for a future time;
identifying available augmented reality download resources corresponding to the client device;
generating selection scores for the versions of the augmented reality objects corresponding to the plurality of augmented reality levels of detail based on the positions of the augmented reality objects with regard to the current field of view, the predicted field of view corresponding to the client device for the future time, and available augmented reality download resources; and
selecting the augmented reality object at the augmented reality level of detail to display to the client device by comparing the selection scores for the versions of the augmented reality objects corresponding to the plurality of augmented reality levels of detail; and
in response to determining that a threshold amount of time has passed since selecting the version of the augmented reality object at the augmented reality level of detail, select an updated version of the augmented reality object at an updated augmented reality level of detail to display to the client device.

12. The system as recited in claim 11, wherein processing movement of the client device to determine the predicted field of view corresponding to the client device for the future time comprises:
determining a current position of the client device and a current view direction of the client device;
identifying movement signals associated with the client device within six degrees-of-freedom; and
determining the predicted field of view corresponding to the client device based on the current position, the current view direction, and the identified movement signals.

13. The system as recited in claim 12, wherein the one or more server devices further cause the system to select the version of the augmented reality object at the augmented reality level of detail to display to the client device by:
generating a level-of-detail utility metric for the version of the augmented reality object;
generating an object priority metric for the augmented reality object; and
determining a selection score, of the selection scores, for the version of the augmented reality object by combining the level-of-detail utility metric, the object priority metric, and a reaction time threshold.

14. The system as recited in claim 13, wherein the one or more server devices further cause the system to, in response to determining that an object has been downloaded, select an updated version of the augmented reality object at an updated augmented reality level of detail to display to the client device.

15. The system as recited in claim 14, wherein the one or more server devices further cause the system to select the updated version of the augmented reality object at the updated augmented reality level of detail by:
determining updated positions of the augmented reality objects with regard to an updated field of view of the client device within the augmented reality scene;
processing updated movement of the client device to determine an additional predicted field of view; and
generating updated selection scores for the versions of the augmented reality objects corresponding to the plurality of augmented reality levels of detail based on the updated positions of the augmented reality objects with regard to the updated field of view and the additional predicted field of view.

16. The system as recited in claim 15, wherein the one or more server devices further cause the system to select the updated version of the augmented reality object at the updated augmented reality level of detail by comparing the updated selection scores for the versions of the augmented reality objects corresponding to the plurality of augmented reality levels of detail.

17. The system as recited in claim 16, wherein selecting the augmented reality object at the updated augmented reality level of detail comprises selecting the version of the augmented reality object at a higher level of detail in response to determining that the client device is moving closer to the augmented reality object within the augmented reality scene.

18. In a digital medium environment for generating and providing augmented reality scenes to client devices, a computer-implemented method of reducing start-up latency for augmented reality scenes comprising:
identifying a plurality of augmented reality objects associated with a requested augmented reality scene, wherein the augmented reality objects each comprise a plurality of versions having a plurality of augmented reality levels of detail;
a step for selecting augmented reality objects at augmented reality levels of detail; and
providing, for display to a client device, the augmented reality objects at the augmented reality levels of detail.

19. The computer-implemented method recited in claim 18, wherein the augmented reality objects comprise a first augmented reality object at a first level of detail and a second augmented reality object at a second level of detail different than the first level of detail.

20. The computer-implemented method as recited in claim 18, wherein providing the augmented reality objects for display comprises downloading the augmented reality objects without downloading at least one augmented reality object from the plurality of augmented reality objects.

* * * * *